(12) United States Patent
Fan et al.

(10) Patent No.: US 11,306,405 B2
(45) Date of Patent: Apr. 19, 2022

(54) APPARATUS, SYSTEMS AND METHODS FOR HIGH EFFICIENCY METAL PARTICLE REGENERATION

(71) Applicant: ZINC8 ENERGY SOLUTIONS INC., Vancouver (CA)

(72) Inventors: Simon Fan, Richmond (CA); Tristan Sloan, Vancouver (CA); David Robert Bruce, Vancouver (CA); John McLeod, Surrey (CA)

(73) Assignee: ZINC8 ENERGY SOLUTIONS, INC., Vancouver (CA)

( * ) Notice: Subject to any disclaimer, the term of this patent is extended or adjusted under 35 U.S.C. 154(b) by 181 days.

(21) Appl. No.: 16/335,771

(22) PCT Filed: Sep. 19, 2017

(86) PCT No.: PCT/CA2017/051105
§ 371 (c)(1),
(2) Date: Mar. 22, 2019

(87) PCT Pub. No.: WO2018/053629
PCT Pub. Date: Mar. 29, 2018

(65) Prior Publication Data
US 2019/0218678 A1    Jul. 18, 2019

Related U.S. Application Data

(60) Provisional application No. 62/399,254, filed on Sep. 23, 2016.

(51) Int. Cl.
C25C 5/02    (2006.01)
C25C 7/00    (2006.01)
C25C 7/02    (2006.01)

(52) U.S. Cl.
CPC ............... *C25C 5/02* (2013.01); *C25C 7/00* (2013.01); *C25C 7/02* (2013.01)

(58) Field of Classification Search
None
See application file for complete search history.

(56) References Cited

U.S. PATENT DOCUMENTS

| 4,025,400 A | 5/1977 | Cook et al. |
| 4,064,033 A | 12/1977 | Dekeister et al. |
| 4,139,679 A | 2/1979 | Appleby et al. |
| 4,198,475 A | 4/1980 | Zaromb |
| 4,676,877 A | 6/1987 | Castillo et al. |

(Continued)

OTHER PUBLICATIONS

International Search Report dated Dec. 7, 2017 for International Application No. PCT/CA2017/051105 (3 pages).

(Continued)

*Primary Examiner* — Louis J Rufo
(74) *Attorney, Agent, or Firm* — Taylor IP, P.C.

(57) ABSTRACT

A regenerator cell for regenerating metallic particles is provided. The regenerator cell includes: a housing for containing a quantity of electrolyte; an anode; a cathode; a cavity at least partially defined by the housing, the cathode and the anode; an inlet port for supplying electrolyte to the cell, the inlet port in fluid communication with the cavity; and an outlet port for expelling electrolyte, particles and/or gas from the cell, the outlet port in fluid communication with the cavity.

12 Claims, 23 Drawing Sheets

(56) References Cited

U.S. PATENT DOCUMENTS

| | | |
|---|---|---|
| 5,206,096 A | 4/1993 | Goldstein et al. |
| 5,228,958 A | 7/1993 | Goldstein et al. |
| 5,419,987 A | 5/1995 | Goldstein et al. |
| 6,015,636 A | 1/2000 | Goldstein et al. |
| 6,382,264 B1 | 5/2002 | Tsai et al. |
| 6,436,539 B1 | 8/2002 | Goldstein et al. |
| 6,706,433 B2 | 5/2004 | Pinto et al. |
| 7,166,203 B2 | 1/2007 | Des Jardins et al. |
| 7,273,537 B2 | 9/2007 | Smedley et al. |
| 8,309,259 B2 | 11/2012 | Friesen et al. |
| 2002/0134688 A1 | 9/2002 | Bandish et al. |
| 2004/0025638 A1 | 2/2004 | Slutskiy |
| 2004/0053132 A1 | 3/2004 | Smedley et al. |
| 2004/0108200 A1 | 6/2004 | Des Jardins et al. |
| 2005/0128315 A1 | 6/2005 | Tsai et al. |
| 2006/0144701 A1* | 7/2006 | Kelly ............ C25C 7/005 204/267 |
| 2013/0186769 A1* | 7/2013 | Powell ............ C25C 7/025 205/343 |
| 2013/0285597 A1 | 10/2013 | Goldstein |
| 2015/0056524 A1* | 2/2015 | Zhang ............ H01M 8/22 429/404 |

OTHER PUBLICATIONS

Written Opinion of the International Searching Authority dated Dec. 7, 2017 for International Application No. PCT/CA2017/051105 (4 pages).

Wen, Y. et al. Preliminary study on zinc-air battery using zinc regeneration electrolysis with propanol oxidation as a counter electrode reaction. Journal of Power Sources. 188.1. (Mar. 1, 2009): 301-307.

Goldstein, J. et al. New developments in the Electric Fuel Ltd. Zinc/air system. Journal of Power Sources, vol. 80, Issues 1-2 (Jul. 1999): 171-179, ISSN 0378-7753.

Jiricny, V. et al. Regeneration of zinc particles for zinc-air fuel cells in a spouted-bed electrode. Journal of applied electrochemistry 30, No. 6 (2000): 647-656.

* cited by examiner

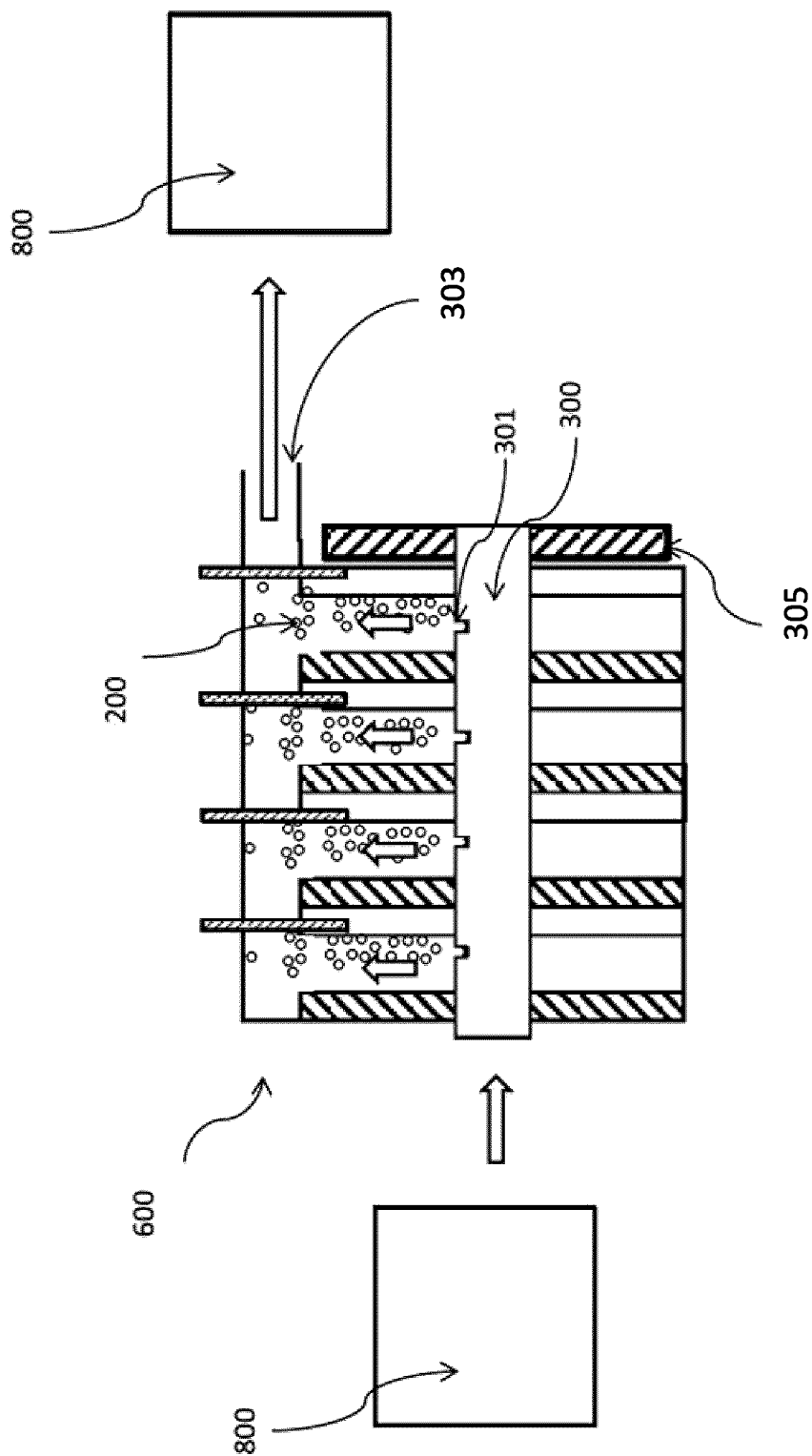

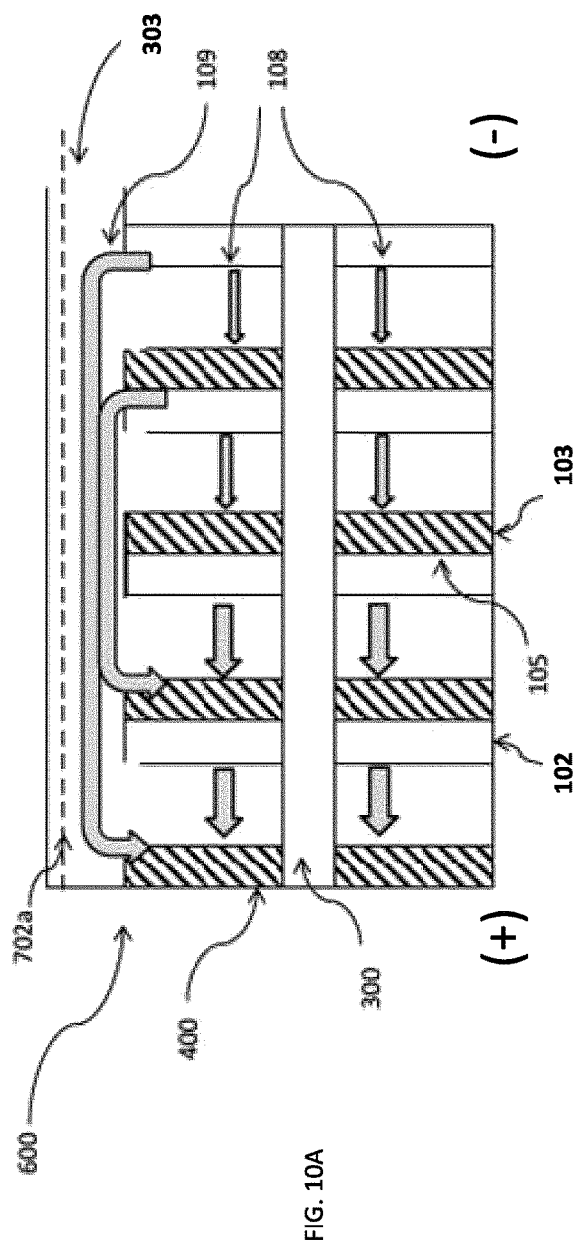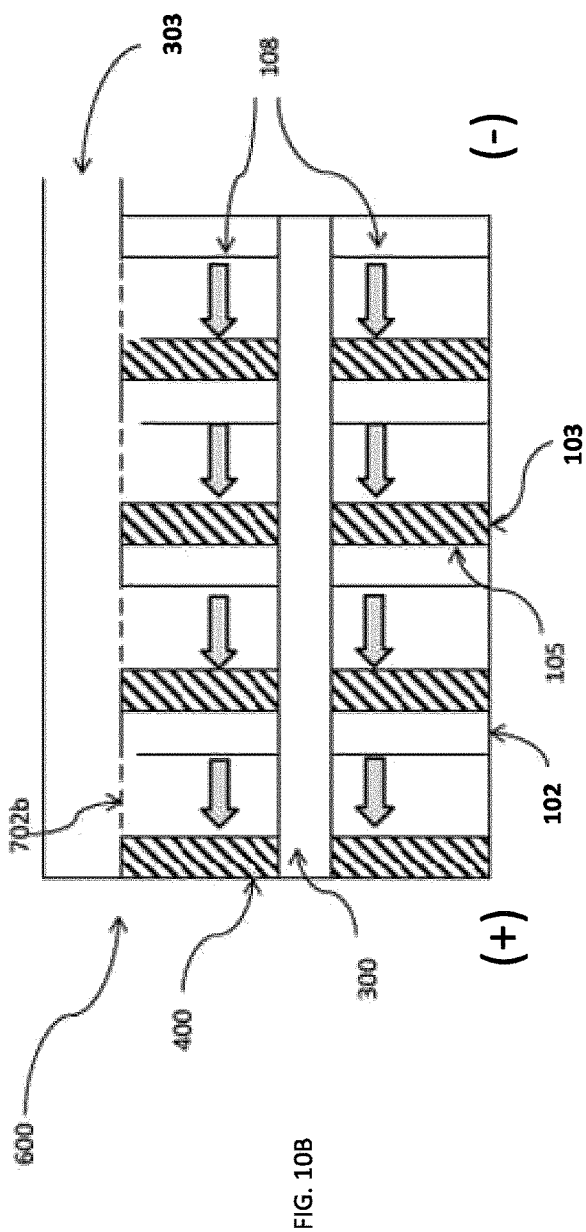

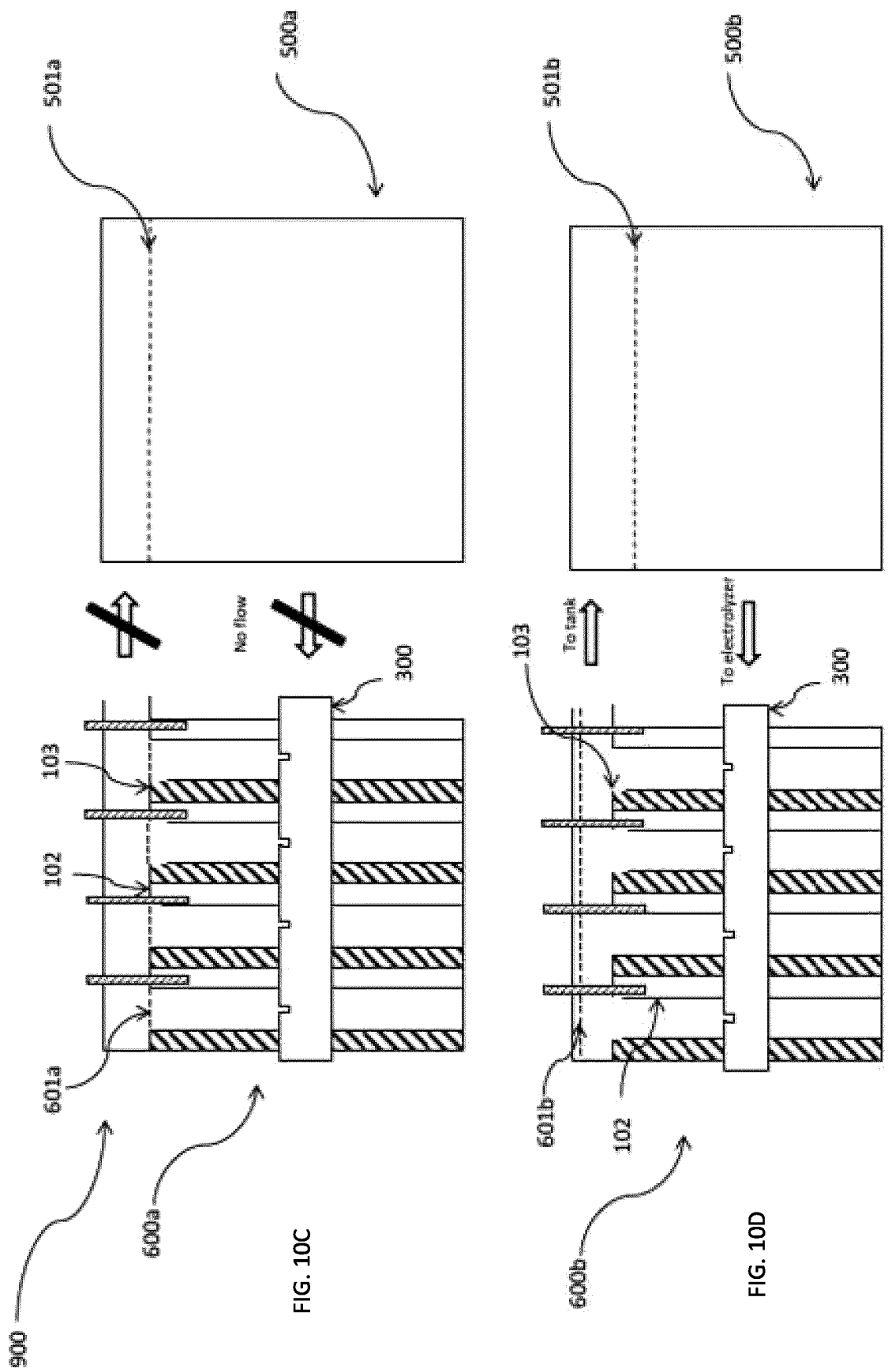

APPARATUS, SYSTEMS AND METHODS FOR HIGH EFFICIENCY METAL PARTICLE REGENERATION

CROSS REFERENCE TO RELATED APPLICATIONS

This application is a 371 national phase entry of Patent Cooperation Treaty patent application No. PCT/CA2017/051105 filed 19 Sep. 2017, which claims priority to and the benefit of U.S. provisional patent application No. 62/399,254 filed 23 Sep. 2016. Both of the foregoing applications are incorporated by reference herein in their entireties for all purposes.

TECHNICAL FIELD

This invention relates to apparatus, systems and methods for metal particle regeneration.

BACKGROUND

U.S. Pat. No. 5,228,958 discloses a method of preparing zinc alkali slurry and a method of separating the slurry into dissolved and undissolved phases. Zinc particles are made from the dissolved phase at 10 to 600 mAcm$^{-2}$ and are deposited onto a cathode unit which must be physically transferred to separate containers to undergo a zinc removal process.

U.S. Pat. No. 6,436,539 further discloses a method of preparing corrosion resistant dendritic zinc alloy particles at 20 to 200 mAcm$^{-2}$. The deposited dendritic zinc alloy is periodically removed from a cathode unit known methods in the art. It also discloses that the removed zinc alloy can be homogenized by methods such as blending.

U.S. Pat. No. 7,166,203 describes a method for making zinc particles for zinc air fuel cells, but the higher current density of 500 to 5000 mAcm$^{-2}$ makes for at least an inefficient generation.

Apparatus, systems and methods for improved efficiency in metal particle regeneration are desirable.

BRIEF DESCRIPTION OF THE DRAWINGS

FIG. 9 is a cross-sectional view of the basic elements of a regenerator stack according to an embodiment of the invention.

FIG. 10A is a cross-sectional view of the basic elements and structure of a regenerator stack according to an embodiment of the invention, with a plurality of cells wherein a shunt current exists.

FIG. 10B is a schematic illustration of the basic elements and structure of the regenerator stack according to an embodiment of the invention, with a plurality of cells wherein the shunt current is eliminated by an air lock mechanism.

FIG. 10C is a schematic illustration of an intermediate tank and of the basic elements and structure of the regenerator stack with a plurality of cells according to an embodiment of the invention, wherein the liquid level in the regenerator stack is identical to the liquid level of the intermediate tank when electrolyte is static and the system is either at equilibrium or at the particle generation step, FIG. 10D is a schematic illustration of an intermediate tank and of the basic elements and structure of the regenerator stack according to an embodiment of the invention, with a plurality of cells where the liquid level in the regenerator stack is higher than the liquid level of the system tank wherefrom electrolyte is pumped.

DETAILED DESCRIPTION

The invention will describe how a high efficiency metal regenerator stack may be operated to obtain dendritic metal slurry. According to some embodiments of the invention, metallic particles of a dendritic morphology are deposited on a cathode unit at a current density in the range from 50 to 600 mAcm$^{-2}$. The regenerator cell or stack then undergoes an in-situ particle removal process wherein the cathode unit is reconditioned for a subsequent deposition process. With reverse polarity dissolution and/or mechanical displacement of deposited metallic particles, a uniform distribution of metallic particles is reliably attained and can be easily fluidized. The invention will further describe what steps must be taken in order to construct a reliable and energy efficient regenerator stack, and a method of making the same. Some embodiments provide an air-lock mechanism to allow for a reliable and uniform metallic particle deposition across any of the cathodes in a plurality of cathodes in series. Some embodiments provide an intermediate tank to decouple the operation of each regenerator stack from operations of the fuel storage tank and of other regenerator stacks housed in the same metal particle regeneration system or subsystem.

Figure 1B:
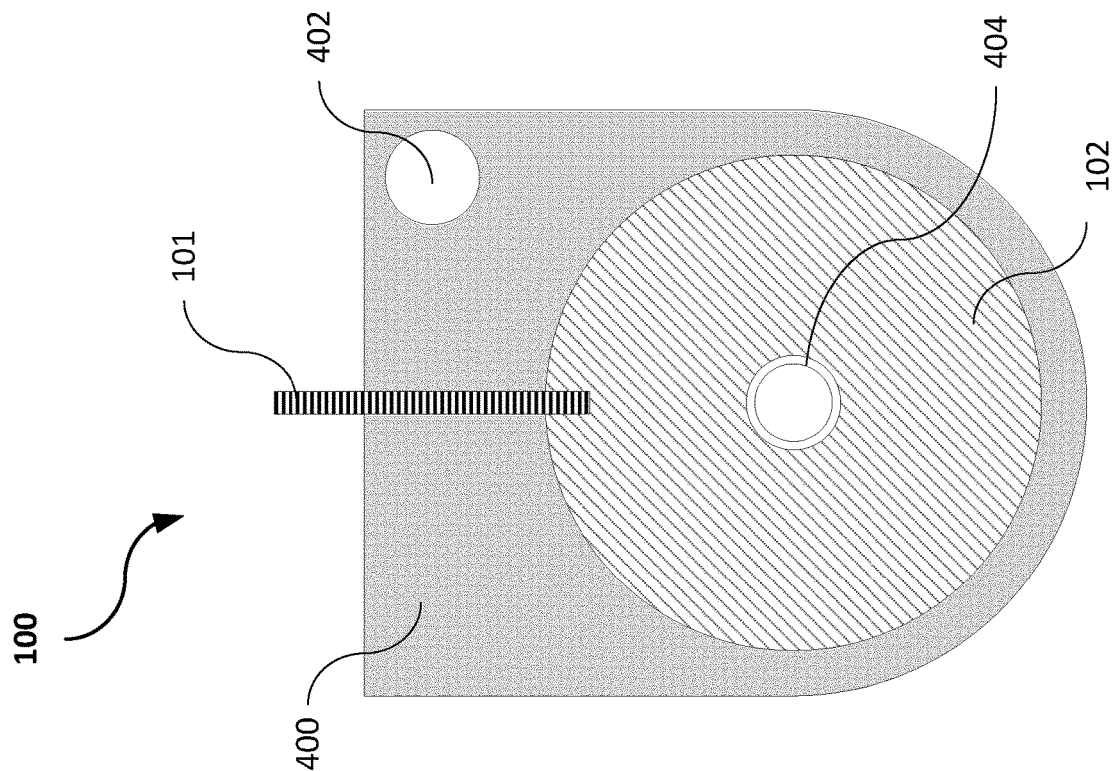
FIGS. 1A and 1B are cross-sectional views of the basic elements and structure of a regenerator cell according to an embodiment of the invention.
Figure 1A:
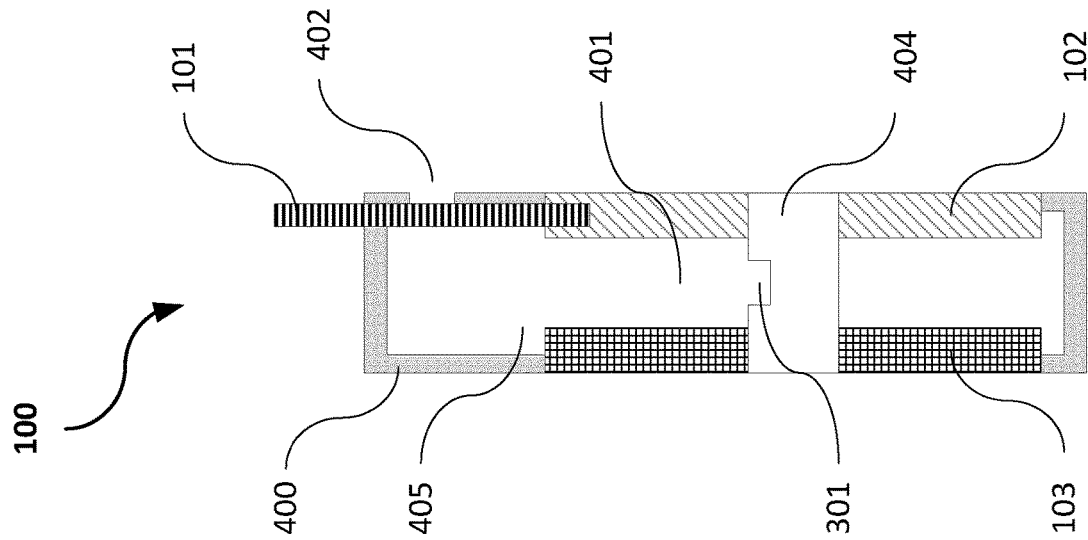

FIGS. 1A and 1B illustrate the basic elements and structure of a regenerator cell 100 according to an embodiment of the invention. The regenerator cell 100 includes a cathode 102, an anode 103, and a connector 101. All elements are situated in a cell housing 400 which may comprise any individual housing, any mechanical supporting element for electrodes and subcomponents, or any dividing elements for physical separations between individual cells. Housing 400 at least partially defines a cavity 405 therein. The cathode 102 and anode 103 are substantially immersed in an electrolyte 401. The anode 103 comprises a conductive material, for example and not limited to nickel, that is stable in the electrolyte and promotes oxygen evolution. The cathode 102 comprises a conductive material, for example and not limited to magnesium, that is stable in the electrolyte, exhibits low surface roughness, and has low adhesion to the deposited metallic material. The connector 101 comprises a conductive material that is in physical and electrical contact with cathode 102. Part of the connector 101 is extended away from the housing 400 to allow for a separate electrical connection. In some embodiments, the electrolyte 401 comprises an aqueous alkali hydroxide solution and inorganic additives that promote dendritic particle growth and suppress hydrogen evolution and metallic particle corrosion. In some embodiments, cathode 102 and anode 103 are substantially planar in form.

The regenerator cell 100 is further equipped with an inlet port 404 that enables the fluidic electrolyte 401 to be introduced into the cell through jet-hole 301. Inlet port 404 may be rotated by an external mechanism (not shown) such that a stream of electrolyte 401 emerging from jet-hole 301 may sweep the entire surface of cathode 102. The metallic particles deposited on cathode 102 are dislodged by this action and may exit regenerator cell 100 through outlet port 402. Inlet port 404 is situated below the normal or static level of electrolyte in the cell that is established by outlet port 402.

Figure 1D:
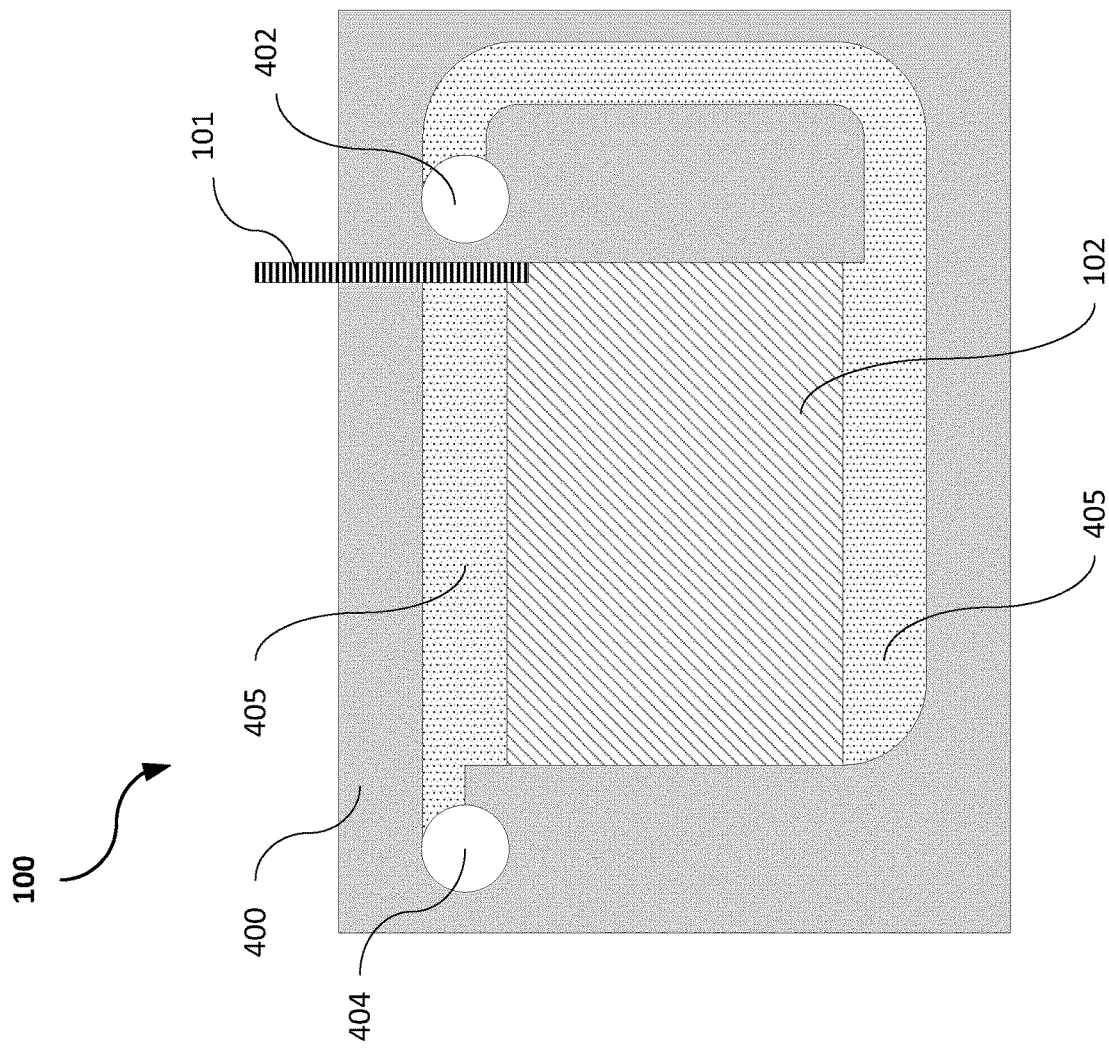
FIGS. 1C and 1D are cross-sectional views of the basic elements and structure of a regenerator cell according to a further embodiment of the invention.
Figure 1C:
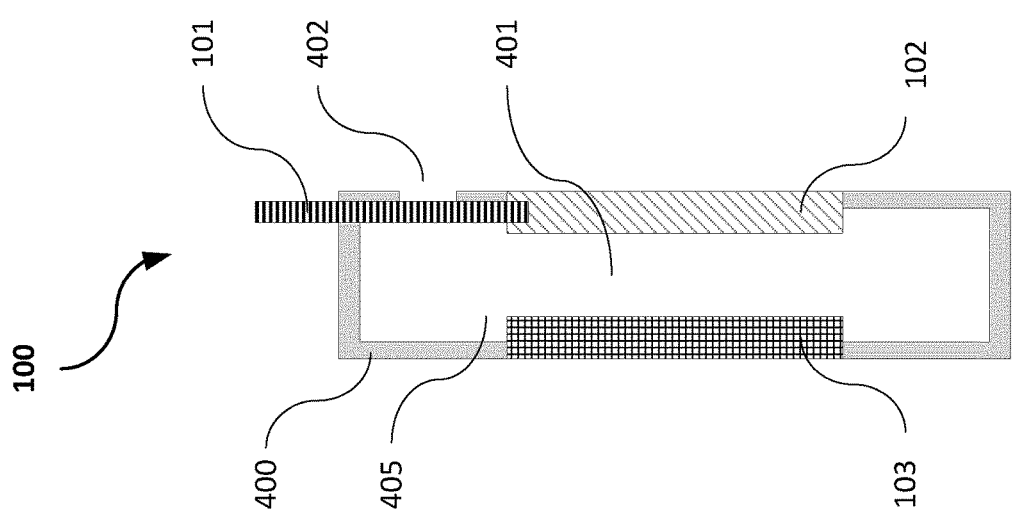

FIGS. 1C and 1D are cross-sectional views of the basic elements and structure of a regenerator cell 100 according to a further embodiment of the invention. The regenerator cell 100 includes a cathode 102, an anode 103, and a connector 101. All elements are situated in a cell housing 400 which may comprise any individual housing, any mechanical supporting element for electrodes and subcomponents, or any dividing elements for physical separations between individual cells. The cathode 102 and anode 103 are substantially immersed in an electrolyte 401. The anode 103 comprises a conductive material, for example and not limited to nickel, that is stable in the electrolyte and promotes oxygen evolution. The cathode 102 comprises a conductive material, for example and not limited to magnesium, that is stable in the electrolyte, exhibits low surface roughness, and has low adhesion to the deposited metallic material. The connector 101 comprises a conductive material that is in physical and electrical contact with cathode 102. Part of the connector 101 is extended away from the housing 400 to allow for a separate electrical connection. In some embodiments, the electrolyte 401 comprises an aqueous alkali hydroxide solution and inorganic additives that promote dendritic particle growth and suppress hydrogen evolution and metallic particle corrosion. In some embodiments, cathode 102 and anode 103 are substantially planar in form.

The regenerator cell 100 is further equipped with an inlet port 404 that enables the fluidic electrolyte 401 to be introduced into the cell. Electrolyte entering inlet port 404 may be directed by the geometry of cavity 405 such that a stream of electrolyte 401 emerging from inlet port 404 may sweep the entire surface of cathode 102. The metallic particles deposited on cathode 102 are dislodged by this action and may exit regenerator cell 100 through outlet port 402. Inlet port 404 and outlet port 402 are substantially located at the same height such that the normal or static level of electrolyte in the cell ensures that cathode 102 and anode 103 both remain immersed in electrolyte when the flow of electrolyte from inlet port 404 is terminated.

Figure 2:
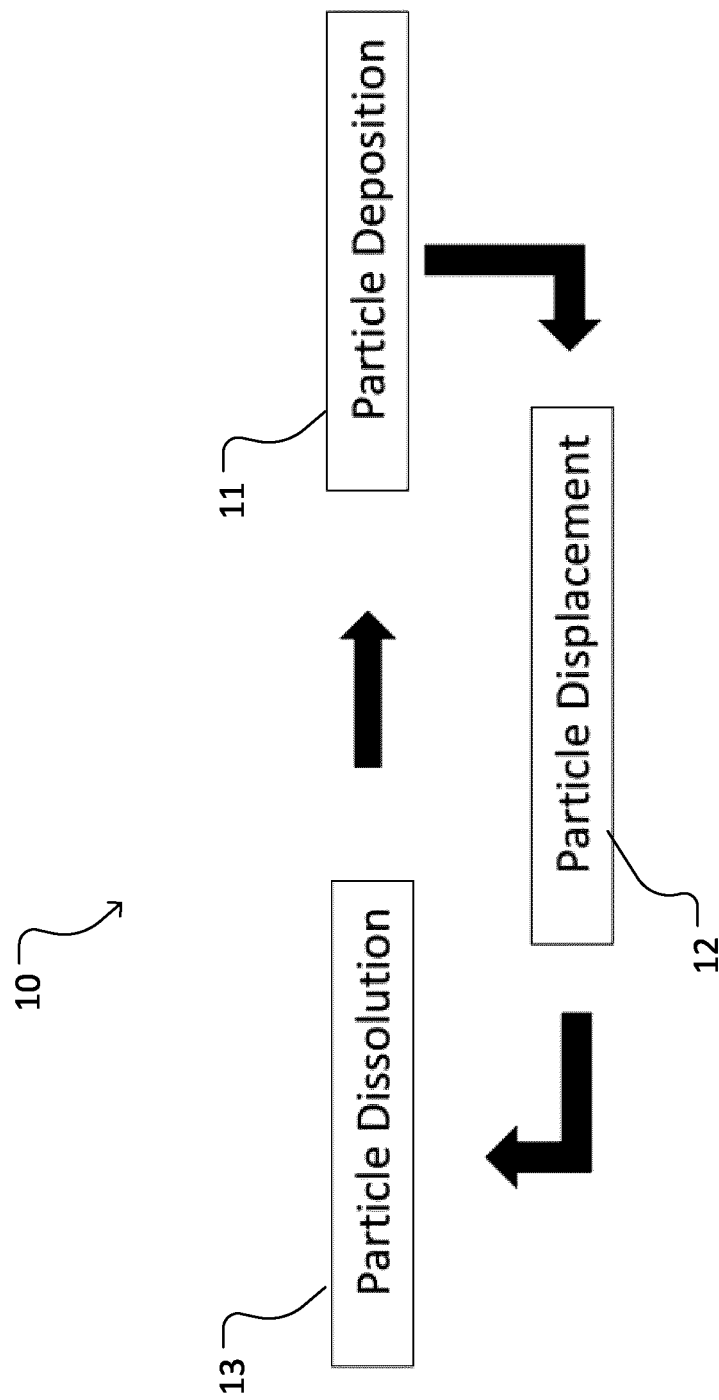
FIG. 2 is a block diagram of a regenerator in-situ process according to an embodiment of the invention.

FIG. 2 shows an in-situ regenerator process 10 according to an embodiment of the invention wherein metallic particles are sequentially deposited, displaced, and dissolved.

In particle deposition step 11, metallic particles of a dendritic morphology are deposited on cathode 102 through electrolytic action. In particle displacement step 12, said metallic particles are dislodged from the surface of cathode 102 through a variety of methods that may include physical interaction with a liquid or a gas, sonication and other similar means. Also in particle displacement step 12, said dislodged metallic particles are removed from the vicinity of cathode 102 by an exchange of electrolyte. In particle dissolution step 13, cathode 102 is returned to its original state by applying a reverse current to regenerator cell 100 to re-dissolve any residual particles that may remain on the surface of cathode 102 after the completion of step 12.

Figure 3B:
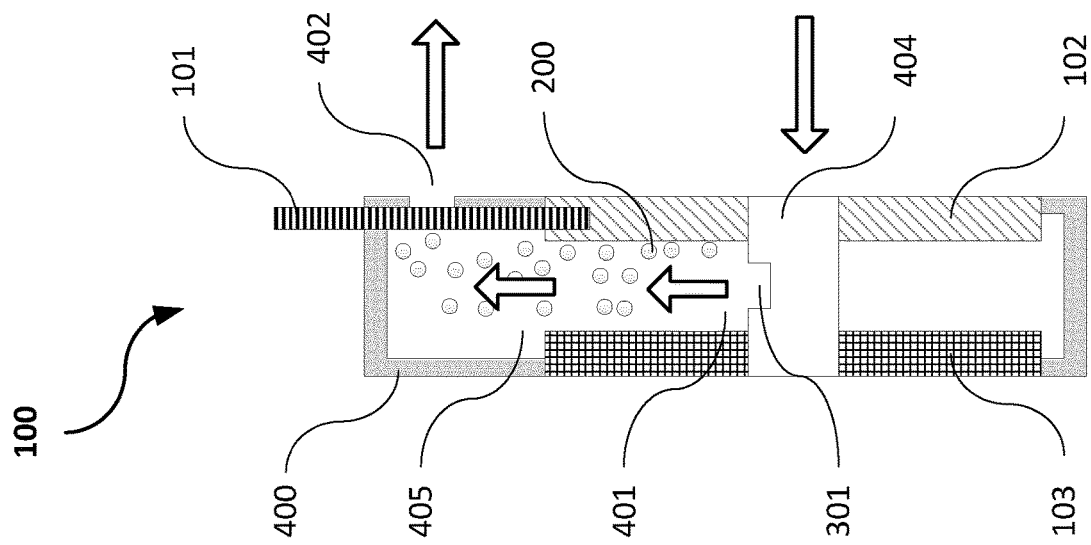
FIG. 3B is a cross-sectional view of the regenerator cell according to the embodiment of the invention shown in FIGS. 1A and 1B in a particle displacement process and a particle dissolution process.
Figure 3A:
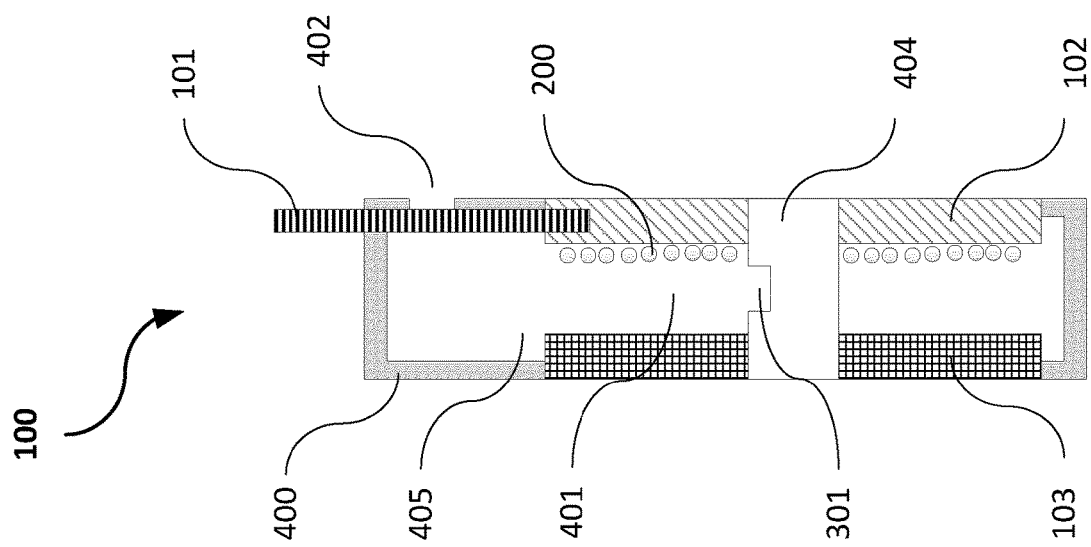
FIG. 3A is a cross-sectional view of the regenerator cell according to the embodiment of the invention shown in FIGS. 1A and 1B in a particle deposition process.

In the embodiment of the particle deposition process shown in FIG. 3A, the regenerator cell 100 uses oxidation of hydroxyl ions in the electrolyte and reduction of a metal ion as the electrochemical reaction couple to deposit metallic particles 200 on cathode 102. As shown in FIG. 3B, in the particle displacement process the metallic particles 200 are displaced from cathode 102 by the jet stream that is introduced through inlet port 404 and jet-hole 301 into the cell cavity 405 and exits through the outlet port 402. In the particle dissolution step the polarities of the two electrodes 102, 103 are reversed through an external circuit for example as illustrated in FIG. 6. The regenerator cell 100 uses oxidation of metallic particles and reduction of water as the electrochemical reaction couple to dissolve residual metallic particles 200 from cathode 102 into the electrolyte 401. It will be apparent to those skilled in the art that the regenerator process described in FIGS. 3A/3B and based on the regenerator cell described in FIGS. 1A/1B is equally applicable to the regenerator cell described in FIGS. 1C/1D.

Figure 4B:
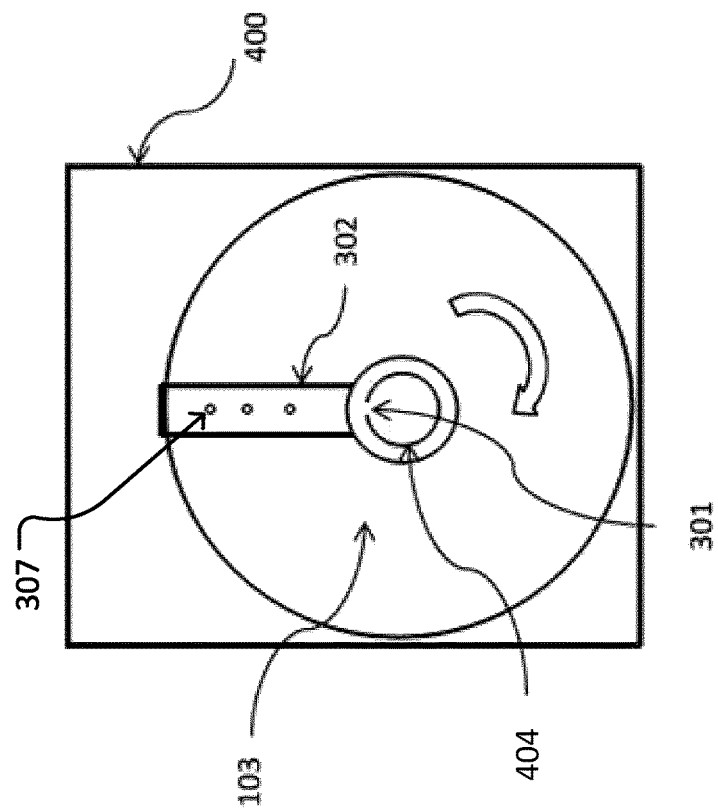
FIG. 4B is a cross-sectional view (perpendicular to the view of FIG. 4A) of the embodiment shown in FIG. 4A, in a particle displacement process and a particle dissolution process wherein the inlet port is driving the rotation of the radial arm.
Figure 4A:
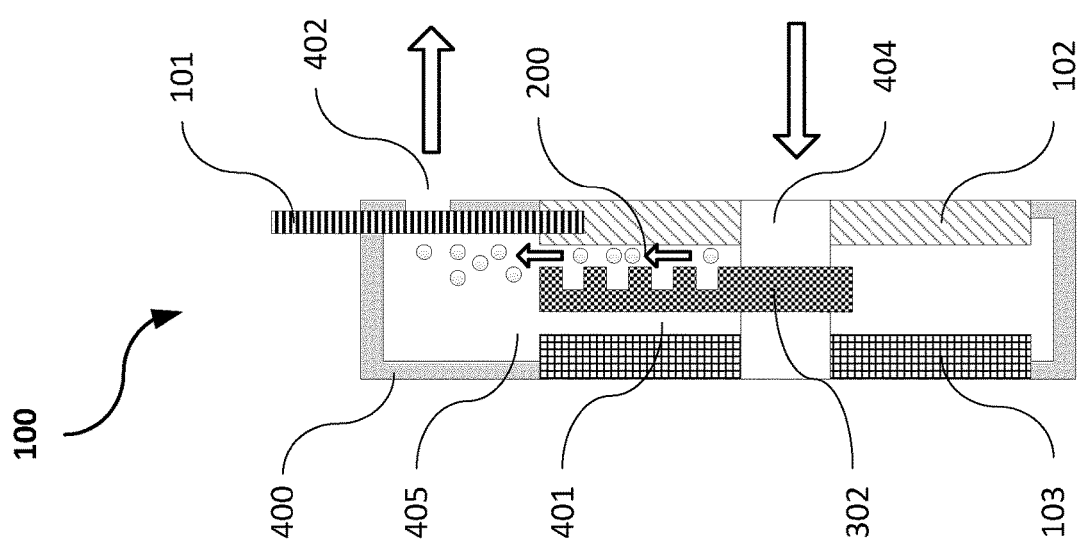
FIG. 4A is a cross-sectional view of a regenerator cell according to an embodiment of the invention, in a particle displacement process and a particle dissolution process wherein a radial arm is attached to an inlet port to achieve localized distribution of electrolyte across the cathode surface.
Figure 5B:
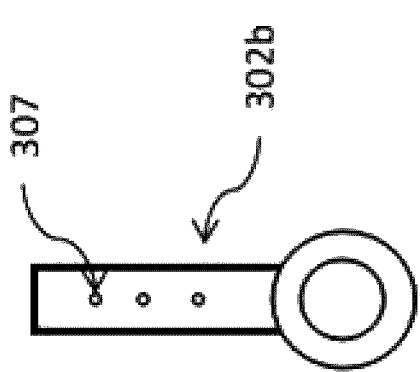
FIGS. 5A to 5D are front views of radial arms according to embodiments of the invention.
Figure 5D:
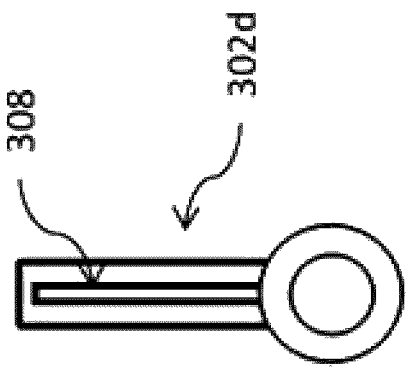
Figure 5A:
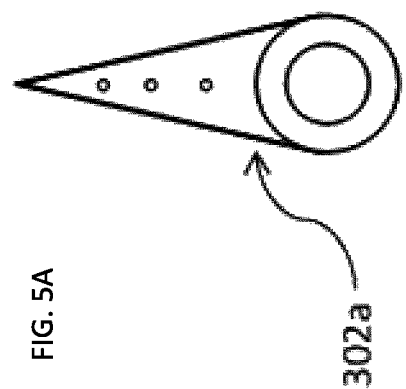
Figure 5C:
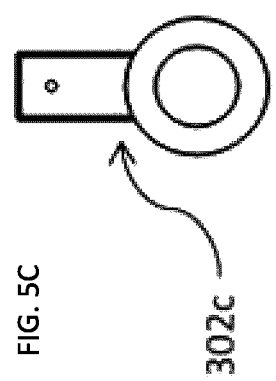

FIGS. 4A and 4B illustrate a regenerator cell for removing the deposited metallic particles according to an embodiment of the invention. The cell comprises an inlet port 404 that is equipped with one or a plurality of jet-holes 301. Inlet port 404 is capable of being rotated about a horizontal axis. FIG. 4A illustrates the attachment of a radial arm 302 for example to the opening of the jet-hole 301 (shown in FIG. 3) to extend the jet stream and redirect the jet stream to a localized area of the cathode 102 whereon metallic particles 200 may have been deposited. FIG. 4B is a front view schematic illustration of a regenerator cell comprising an inlet port 404 with a single or a plurality of jet-holes 301 wherein the jet-hole 301 is in fluidic connection with the cavity of radial arm 302 having a single or a plurality of openings 307.

FIGS. 5A to 5D illustrate non-limiting examples of radial arms 302a, 302b, 302c and 302d having a single or a plurality of openings 307, 308. Said radial arms can be mounted on said inlet port and may direct the jet stream to specific areas of cathode 102. The degree and number of openings affect the level of particle dislodgement within the cavity of the regenerator cell. One example is to arrange openings 307 to be evenly spaced along the radial arm to achieve a substantially distributed and pressured jet stream across the surface of the cathode for particle dislodgement. Another example is to limit the number of openings 307 to, for example, one, wherein the resulting pressurized jet stream becomes relatively powerful due to the reduction of pressure drop across radial arm 302. Yet another example is to have a single enlarged opening or an open channel 308 that increases the pressure drop across radial arm 302 and yields a high flow jet stream which covers a greater area of the cathode surface.

Figure 6B:
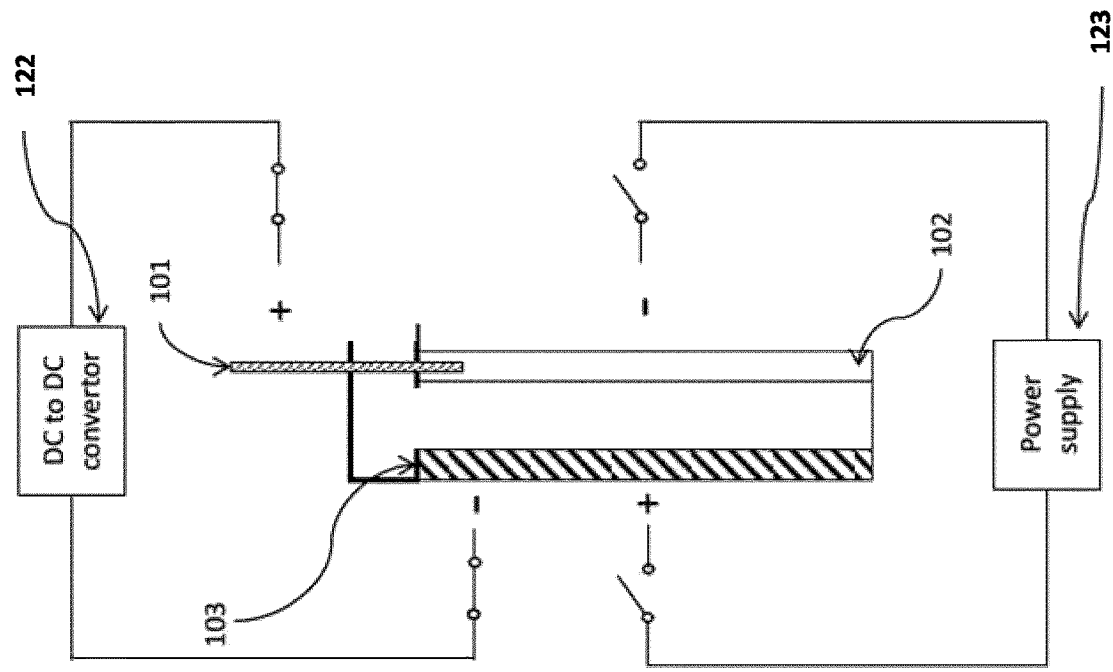
FIG. 6B is a cross-sectional view of a regenerator cell according to the embodiment shown in FIG. 6A, showing the basic electrical circuits between the anode and the cathode in a particle displacement process and a particle dissolution process.
Figure 6A:
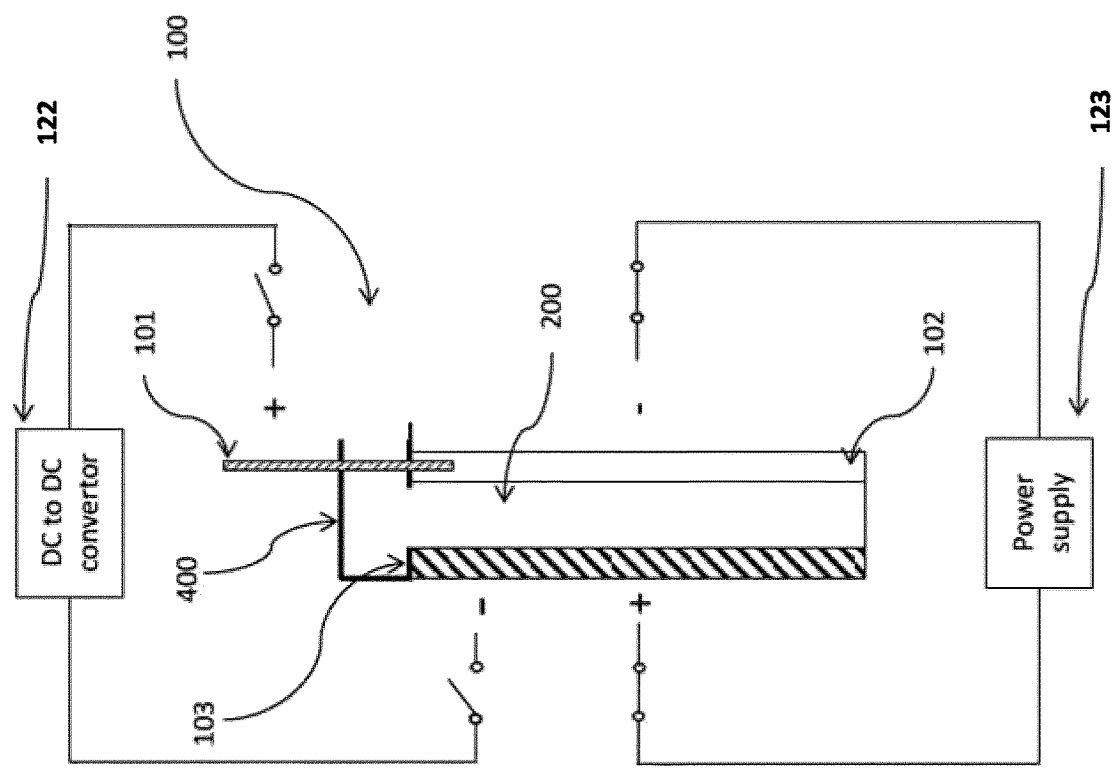
FIG. 6A is a cross-sectional view of a regenerator cell according to an embodiment of the invention, showing the basic electrical circuits between the anode and the cathode in a particle deposition process.

FIGS. 6A and 6B are schematic illustrations of the electrical circuit connection around the regenerator cell 100 according to an embodiment of the invention. FIG. 6A illustrates the circuit configuration when metallic particles are being deposited onto cathode 102 by applying a current across cathode 102 and anode 103 in a current density range, for example, between 50 mAcm$^{-2}$ and 600 mAcm$^{-2}$. FIG. 6B illustrates the circuit configuration when the deposition of metallic particles is paused and wherein a particle dissolution step occurs. The connector 101 is connected to for example and not limited to a DC to DC converter 122 that is used to drive power across the cell to dissolve the metallic particles 200 into the electrolyte. A voltage, for example but not limited to, of less than 1.3 V is applied across a cathode and an anode, wherein the polarity of each electrode has been switched to an anode and a cathode, respectively. It will be apparent to those skilled in the art that DC to DC converter 122 and main power supply 123 are never applied to regenerator cell 100 simultaneously.

Electrodeposition generally occurs in the presence of electrolyte and conducting electrodes. If there is a physical interface between the electrode and the cell housing in the presence of electrolyte, during particle deposition said deposition typically occurs inside the edge and along the wall normal to the plane of the electrode. Such deposition is known as edge deposition. Since said edge deposition exists in a location away from any jet stream, the dislocation of deposited particles becomes inefficient or nonexistent. A successive series of deposition processes may substantially enlarge said deposited particles, forming, for example but not limited to, clumps of particles which may short-circuit the cell or may plug the inlet or outlet of a stack to impede flow of electrolyte. Accordingly, said clumps of particles may contribute to a number of failing mechanisms for an electrolyzer cell or regenerator.

Figure 7B:
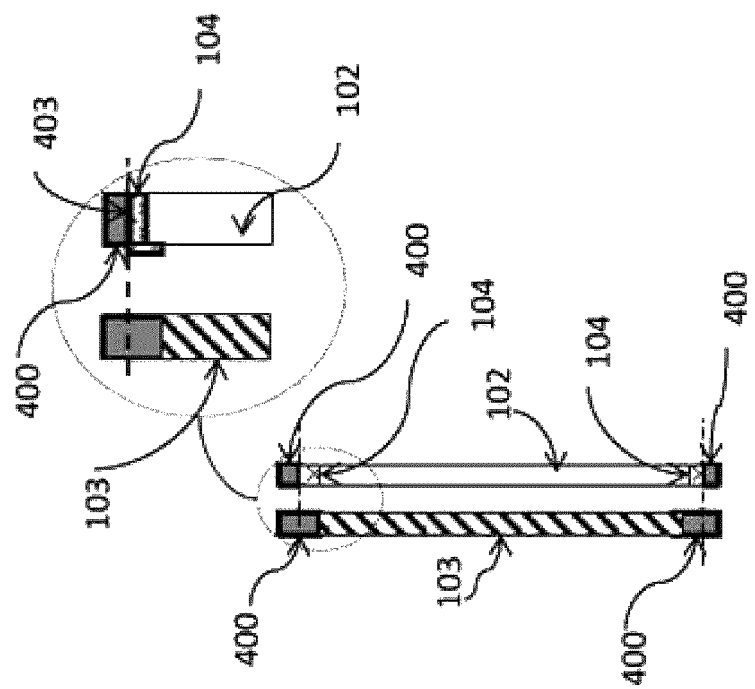
FIG. 7B is a partial cross-sectional via of a regenerator cell according to an embodiment of the invention, showing a non-porous and non-conductive coating applied to further prevent an edge deposition.
Figure 7A:
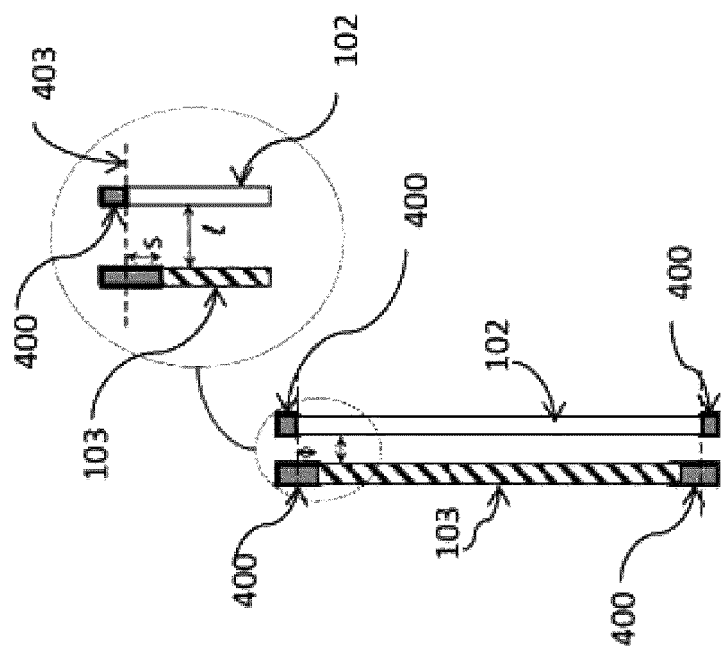
FIG. 7A is a partial cross-sectional via of a regenerator cell according to an embodiment of the invention, showing the offset relationship between the cathode and the anode, wherein the anode is smaller than the cathode according to an offset distance.

According to an embodiment of the invention, said edge deposition can be significantly reduced by adjusting the relative geometries of the two electrodes. FIG. 7A is a schematic cross-sectional illustration of the basic elements of an electrolytic cell wherein the length, height or diameter of the anode 103 is shorter than that of the cathode 102. Both of the cathode and the anode may extend to the cell housing 400. A close-up diagram further illustrates the length-to-gap ratio (s/l) between the anode 103 and the cathode 102 wherein the (s) term defines the difference in diameter or length between said anode and that of said cathode or the offset distance, and wherein the (l) term defines the separation between opposite faces of the anode 103 and the cathode 102. Maintaining said ratio within predetermined ranges can significantly reduce said edge growth. In some embodiments the length-to-gap ratio (s/l) may range from 1:1 to 1:40.

In some embodiments, said edge deposition may be reduced or eliminated by applying a non-porous and non-conductive coating on the surface of the electrode closer to the mechanical interface between a cathode and cell housing. FIG. 7B illustrates the location of said non-conductive coating 104 wherein the mechanical interface 403 between the housing 400 and the edge of the cathode 102 is coated. In one embodiment, the non-conductive coating 104 can extend to cover the entire length difference, (s). The two described embodiments can be used separately or together to inhibit said edge deposition.

Figure 8:
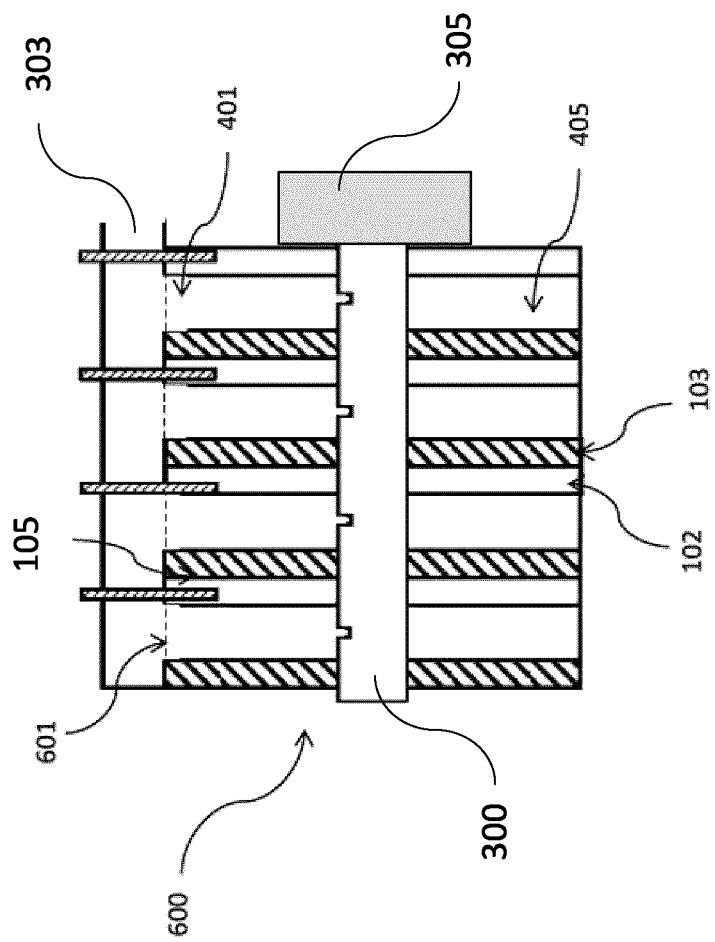
FIG. 8 is a schematic illustration of the basic elements and structure of a regenerator stack according to an embodiment of the invention, wherein the rotation of the manifold is driven by an external component.

FIG. 8 is a schematic illustration of the basic elements and structure of a regenerator stack 600 according to an embodiment of the invention. Regenerator stack 600 includes a plurality of regenerator cells according to the principles of the invention wherein the cathode 102 of each cell and the anode 103 of an adjacent cell are in physical and electrical contact to form a bipolar electrode 105 and said bipolar electrode provides electrical connection between adjacent cells. The electrolyte level 601 of each cell is maintained by an airlock mechanism described in FIG. 10. An inlet manifold 300 is provided in fluid communication with the inlet port (not shown) of each individual regenerator cell. In some embodiments inlet manifold 300 may be a single component. In other implementations inlet manifold 300 may be assembled from a plurality of inlet ports 404 supplying each individual regenerator cell. Inlet manifold 300 may be rotated by, for example and not limited to, a magnetic, fluidic or mechanical component or any combination of these components 305. An outlet manifold 303 is provided in fluid communication with the outlet port (not shown) of each individual regenerator cell. In some embodiments outlet manifold 303 may be a single component. In other implementations outlet manifold 303 may be assembled from a plurality of outlet ports 404 provided by each individual regenerator cell.

FIG. 9 is a schematic illustration of the basic elements of a regenerator stack 600 wherein electrolyte is drawn from a source for a particle displacement process according to an embodiment of the invention. The particle displacement process includes a washing mechanism to distribute flow across all regenerator cells. Electrolyte is drawn from, for example but not limited to, a fuel storage tank 800. Said fluid flows through the jet-holes 301 of inlet manifold 300 into each regenerator cell as a jet stream to displace metallic particles 200. Said fluid then exits through outlet manifold 303 at close to atmospheric pressure.

Regenerator cells according to some embodiments of the invention are open to atmospheric pressure because it is advantageous that the oxygen is able to escape the regenerator cell at atmospheric pressure to avoid the need for pumps, valves, compressors and storage tanks that might otherwise be required. For instance, oxygen gas produced by the regeneration process can be released to atmospheric pressure immediately without the need of a gas-liquid separation process, and/or a dedicated conduit for oxygen transfer to a gas storage tank. The gas release at atmospheric pressure also avoids gas accumulation and any development of back-pressure that could impede the flow of the gas and adversely affect the particle deposition process.

Ionic currents are generated and driven by the cell-to-cell potential gradient of the stack. When each regenerator cell in a stack shares a common electrolyte wherein a low resistance path exists, a shunt current occurs. "Shunt current" is a term to describe the situation wherein the current chooses a less resistive pathway and may bypass intermediate cells to reach (typically) the end cell wherein significant particle deposition occurs due to the increased current flow. In some embodiments, an air-lock mechanism is introduced to significantly reduce or to eliminate shunt current by creating ionic separation between each cell.

FIGS. 10A and 10B illustrate the importance of an air-lock mechanism according to an embodiment of the invention to prevent said shunt current. When electrical current is fed to the terminal cells of a bipolar electrolyzer, ionic current 108 is generated and flows across each cell. Some ionic current, especially from end cells, will flow through the electrolyte in, for example, the inlet manifold, the outlet manifold and/or the connecting piping to the cell. Said current flowing in this manner is known as shunt current 109 and is shown in FIG. 10A. Said shunt current leads to a higher deposition at cells on one end versus cells on the other end. As illustrated in FIG. 10B, one way to mitigate said shunt current is to eliminate the pathway for shunt current 109 by lowering the electrolyte level from an upper height 702a (as shown in FIG. 10A) to a lower height 702b such that the electrolyte in each cell cavity 405 is physically separated by both electrodes 102 and/or cell housing 400. Cell housing 400 may consist of any individual housing, any mechanical supporting element for electrodes and subcomponents or any dividing elements for physical separations between individual cells. This reducing or eliminating of shunt current is made possible when the outlet manifold 303 shares the same level as that of the height 702b, i.e., said air-lock mechanism. For instance, pressurized electrolyte is being pumped to said stack which is open to atmospheric pressure, as illustrated in FIG. 10A. When the flow of electrolyte is stopped, the electrolyte is allowed to be discharged and drained through outlet manifold 303. As a result, the electrolyte level drops from an upper height 702a to a lower height 702b and the air-lock is established, creating ionic separation between each cell and thereby eliminating shunt currents, after which an efficient particle deposition process can commence.

FIG. 10C and FIG. 10D are schematic illustrations of an air-lock mechanism and of the basic elements and structure of the regenerator stack 600 according to an embodiment of the invention. Regenerator stack 600 includes a plurality of bipolar electrodes 105 each comprising of a cathode 102 and an anode 103. Bipolar electrodes 105 form a plurality of regenerator cells wherein each regenerator cell shares the same electrolyte level 601a, 601b with the tank electrolyte level 501a, 501b.

FIG. 10C is a schematic illustration of a regenerator stack 600a and an intermediate tank 500a which are in fluidic connection and positioned at a physical horizontal level. The stack 600a, 600b and the intermediate tank 500a, 500b are both open to atmospheric pressure, which is integral to releasing the generated oxygen at pressures close to atmospheric. In a particle deposition process as illustrated in FIG. 10C, the electrolyte level 601a of the stack 600a is at the same height as the electrolyte level 501a of an intermediate tank 500a. As another advantage, a separated intermediate tank 500a for each separated stack 600a allows for the decoupling of pressure from the hydraulic head pressure of the fuel storage tank and enables a physical compartmentalization into subdivided bay area 902, which is shown and explained in FIG. 11.

FIG. 10D is a schematic illustration of the liquid level in the regenerator 601b in a particle displacement and dissolution processes wherein the liquid level 601b of the stack 600b is higher than the liquid level 501b of the intermediate tank 500b wherefrom electrolyte is continuously pumped into the regenerator stack 600b. After the displacement and the dissolution processes, there is no electrolyte flow between the stack 600b and the intermediate tank 500b of which the liquid level allows to come to equilibrium as illustrated in FIG. 10C.

Figure 11:
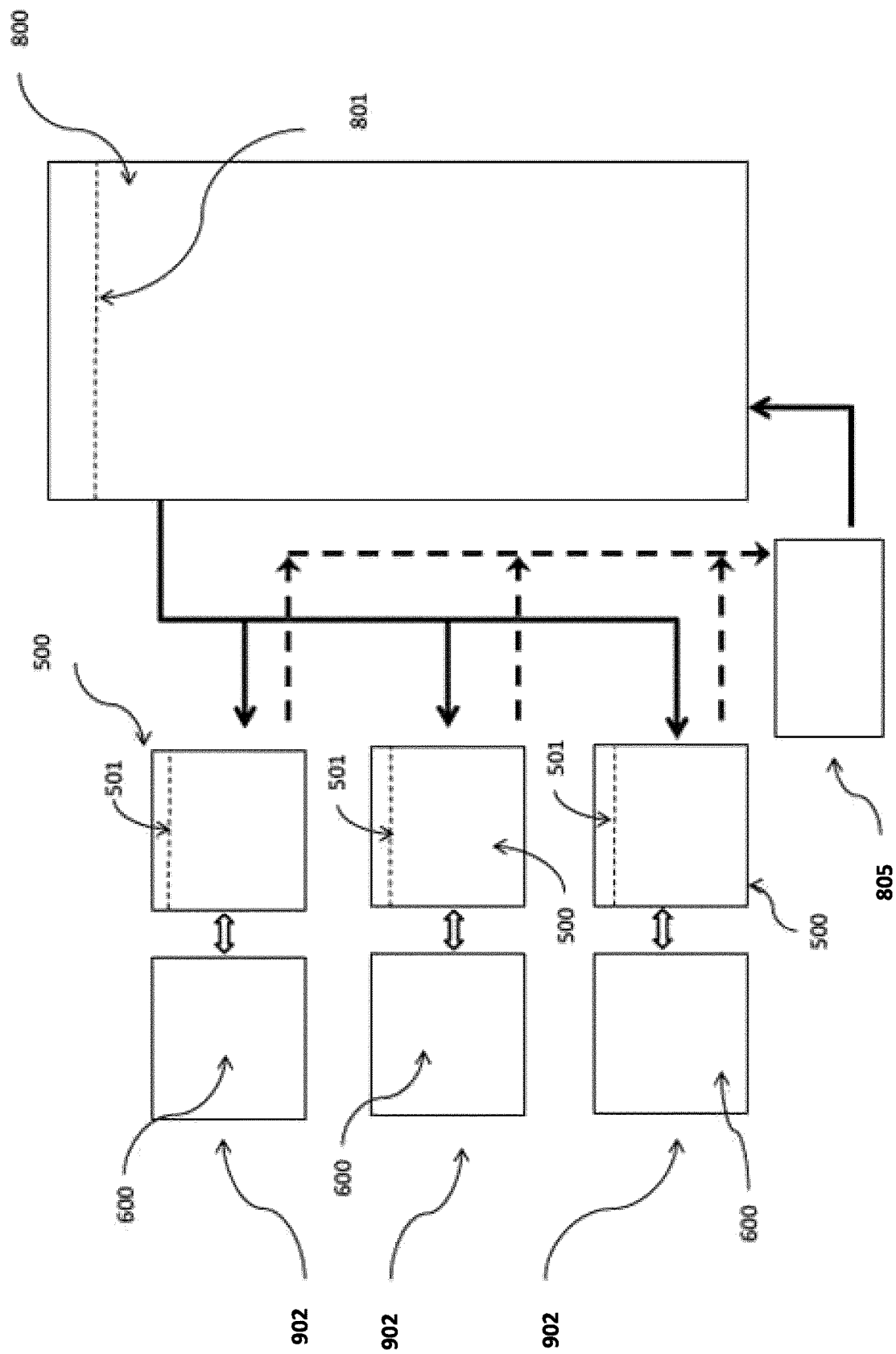
FIG. 11 is a block diagram illustrating the basic elements of the regenerator bay according to an embodiment of the invention, wherein the intermediate tank enables the compartmentalization of a plurality of regenerator stacks at different levels relative to the main system tank.

FIG. 11 is a block diagram illustrating one embodiment of compartmentalization. There is no pump shown as it is obvious to a person skilled in the art that a pump or other pressure generating device is required to transfer electrolyte between different units. The fuel storage tank 800 contains metallic particles and electrolyte at a level 801. By drawing electrolyte from the fuel storage tank 800, the intermediate tanks 500 can decouple from the hydraulic head pressure of fuel storage tank 800 and supply electrolyte to their respective regenerator 600 according to their respective hydraulic head pressure. Subdivided bay area 902 can therefore be equipped with regenerator stacks and intermediate tanks at different vertical heights. All metallic particles along with electrolyte from the subdivided bay area 902 may be collected in sump tank 805 and subsequently transferred to fuel storage tank 800.

Figure 12:
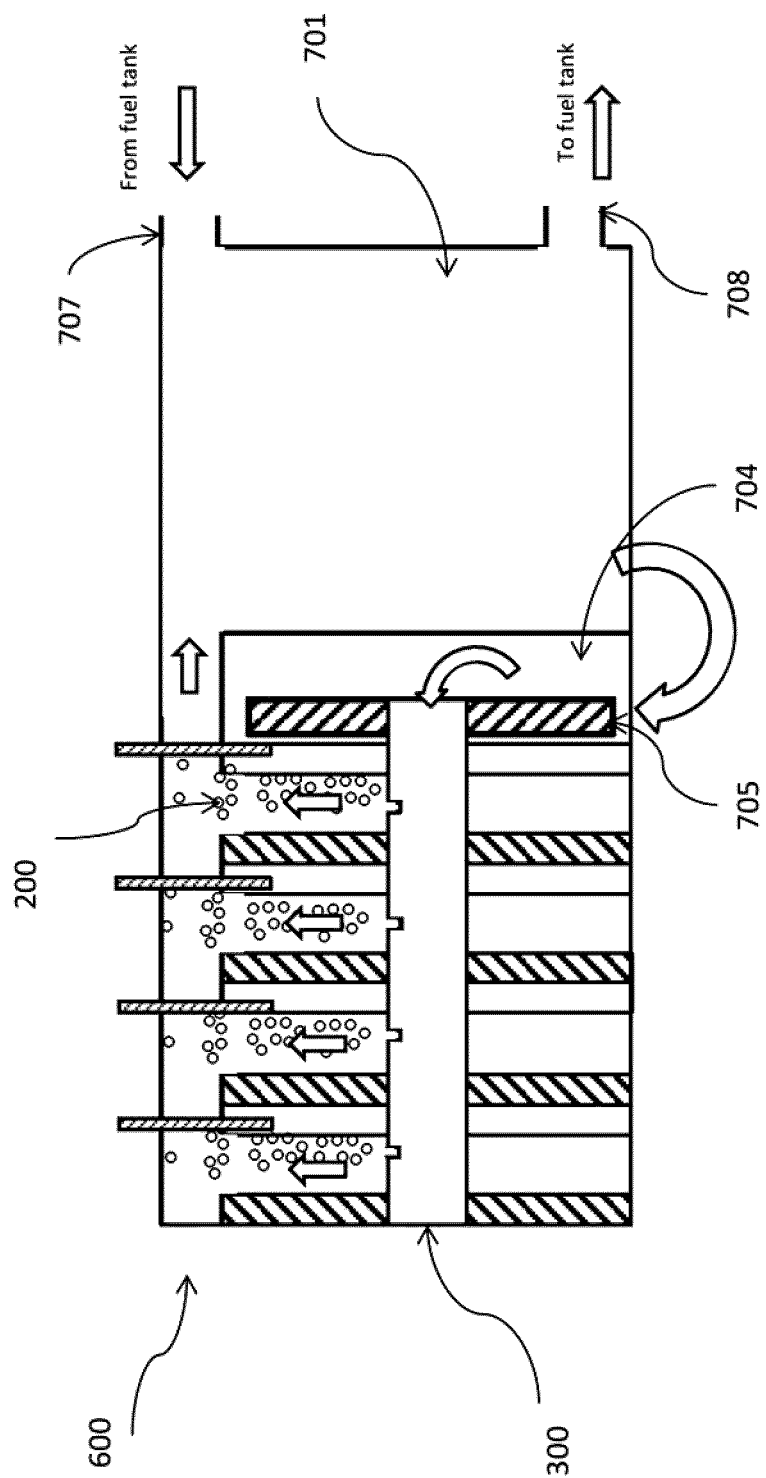
FIG. 12 is a schematic illustration of the basic elements and structure of the regenerator stack with a plurality of cells according to an embodiment of the invention, wherein the intermediate tank is integrated into said regenerator stack.

FIG. 12 is a schematic illustration of the basic elements of a regenerator stack 600 according to an embodiment of the invention. Stack 600 is equipped with an integrated intermediate tank 701 wherein electrolyte is drawn from a source through the inlet port 707. During the particle displacement process wherein a washing mechanism is required to distribute flow across all regenerator cells, a pump is used to draw liquid from the intermediate tank 701 and inject electrolyte into the compartment 704 onto a paddle of a wheel 705. Said injection of the fluid onto each of the paddles drives the rotation of the wheel attached to inlet manifold 300. Said fluid escapes the compartment 704 through the cavity of the manifold and through the jet-holes 301 into each regenerator cell as a jet stream to displace metallic particles 200. Said fluid then returns to the tank 701. In a normal operation, metallic particles are periodically transferred to the fuel storage tank (not shown) through the outlet port 708 of the integrated intermediate tank 701.

Figure 13A:
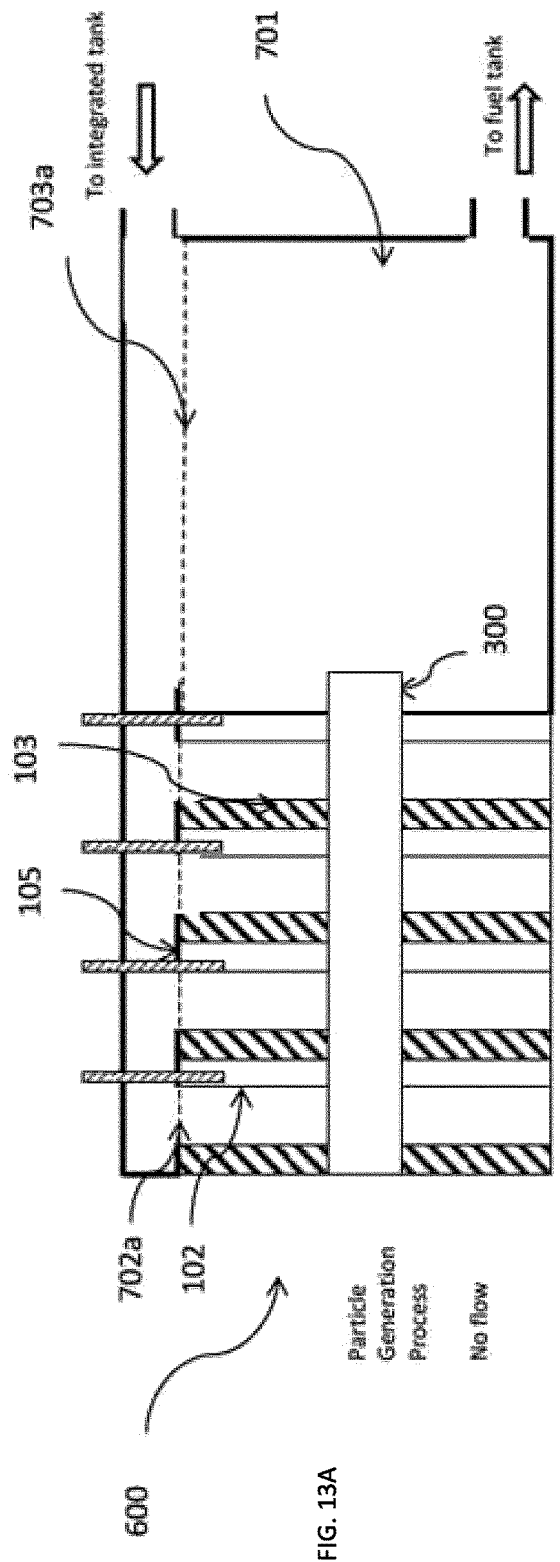
FIG. 13A is a schematic illustration of the basic elements and structure of the a regenerator stack with a plurality of cells and an integrated intermediate tank according to an embodiment of the invention, wherein the liquid level of said regenerator stack is identical to the liquid level of said integrated intermediate tank when the electrolyte is static and the system is either at equilibrium or at the particle generation step

FIG. 13A is a schematic illustration of an alternative embodiment of a regenerator stack 600 with an integrated intermediate tank 701. The integration of said intermediate tank 701 and regenerator stack 600 allows for the elimination of connecting piping and a smaller form factor while maintaining the advantage of compartmentalization capability. Components for driving the rotation of the manifold are omitted from the drawing to simplify the schematic. At the start of the particle deposition process as illustrated in FIG. 13A, the electrolyte level 702a of regenerator stack 600 is at the same height as the electrolyte level 703a of the integrated intermediate tank 701.

Figure 13B:
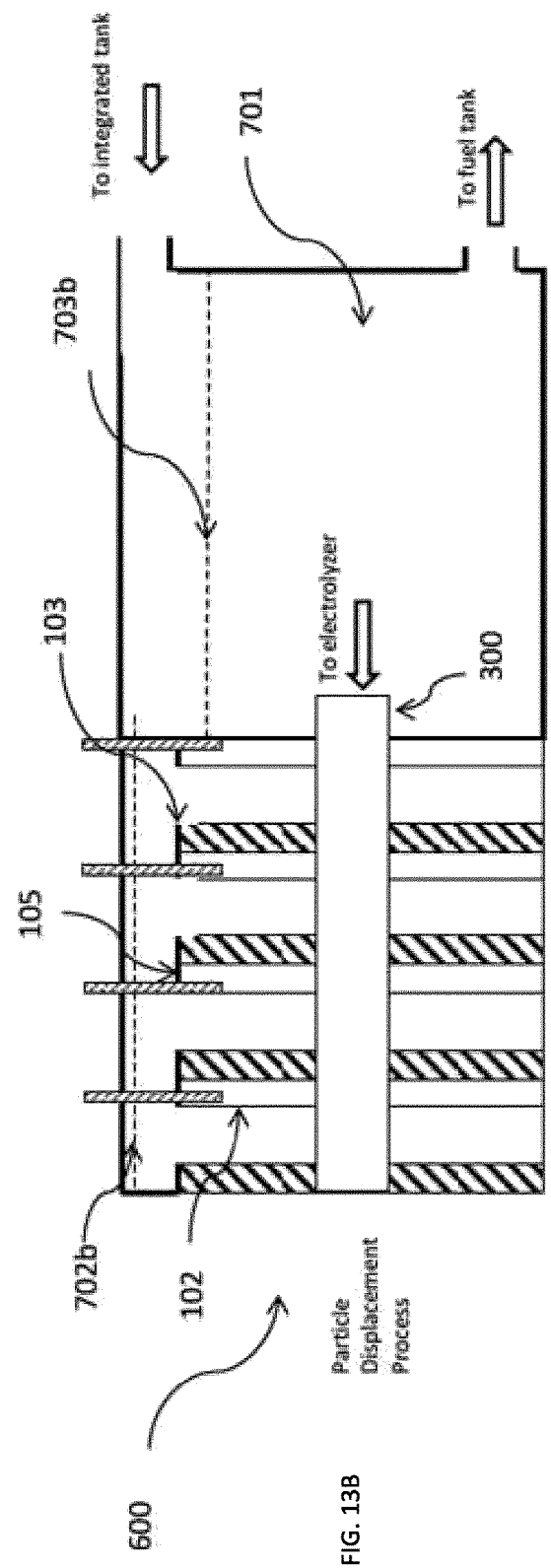
FIG. 13B is a schematic illustration of the basic elements and structure of the said regenerator stack with a plurality of cells and an integrated intermediate tank according to an embodiment of the invention, wherein the liquid level of said regenerator stack is higher than the liquid level of said integrated intermediate tank wherefrom the electrolyte is pumped

FIG. 13B is a schematic illustration of the electrolyte level in said regenerator stack 600 during particle displacement and dissolution processes wherein the electrolyte level 702b of the regenerator stack 600 is higher than the electrolyte level 703b of said integrated intermediate tank 701 wherefrom electrolyte is continuously pumped into said regenerator stack 600. After the displacement and the dissolution processes there is no electrolyte flow between regenerator stack 600 and intermediate tank 701 wherein due to the balancing of hydraulic head, electrolyte levels of regenerator stack 600 and intermediate tank 701 will return to equilibrium as illustrated in FIG. 13A.

Figure 14:
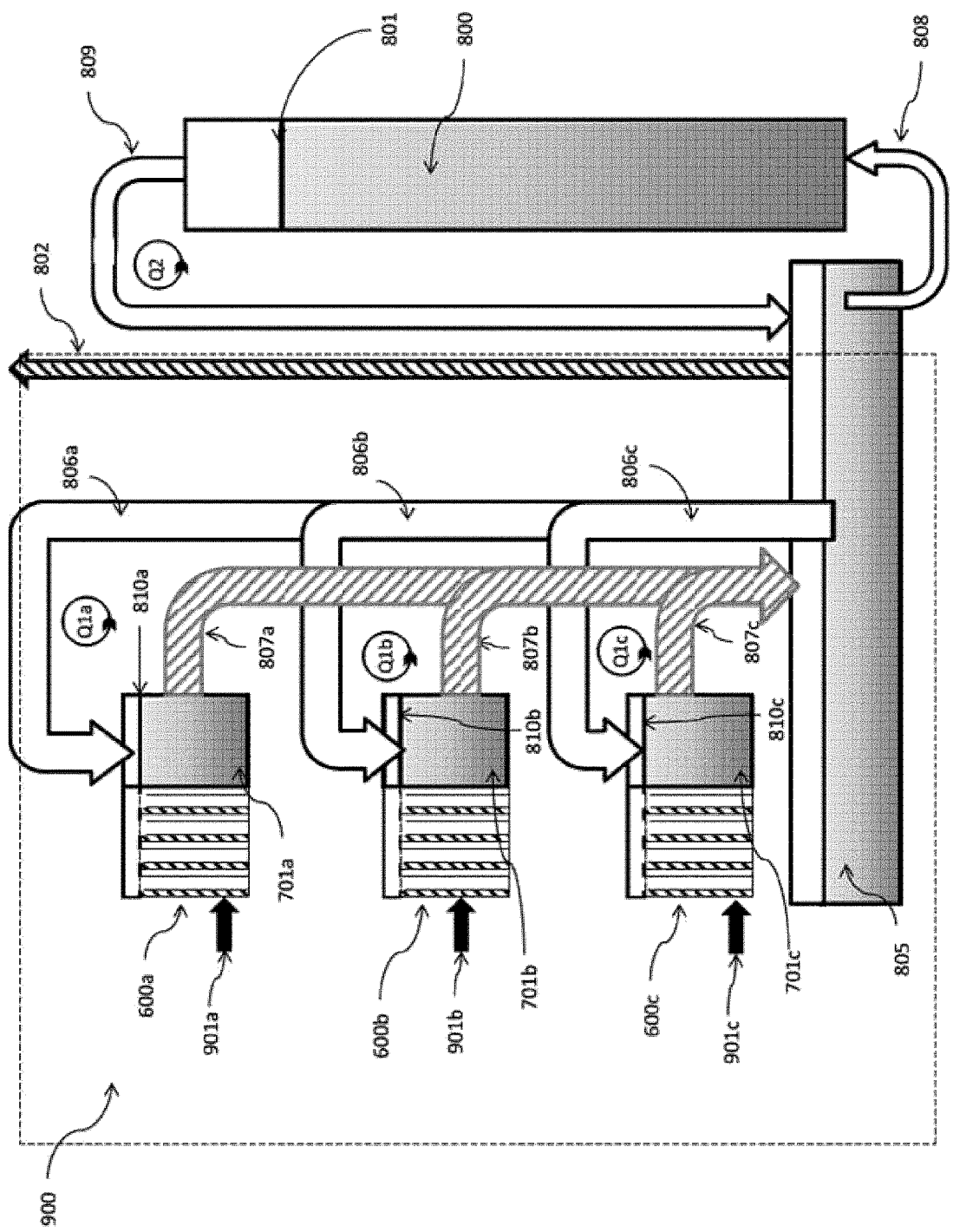
FIG. 14 is a block diagram showing an alternative embodiment of compartmentalization whereby a plurality of regenerator stacks may be operatively connected to construct a particle regeneration subsystem.

FIG. 14 is a block diagram showing an alternative embodiment of compartmentalization whereby a plurality of regenerator stacks may be operatively connected to construct a particle regeneration subsystem 900. Subsystem 900 is primarily comprised of regenerator stacks 600a, 600b, 600c, intermediate tanks 701a, 701b, 701c, sump tank 805 and fuel storage tank 800. Regenerator stacks 600a, 600b, 600c are equipped with integrated intermediate tanks 701a, 701b, 701c thereby substantially eliminating the requirement for interconnecting conduits. Other arrangements and designs of intermediate tanks may work in this particle regeneration subsystem 900. The system is recharged by feeding metal ion-rich electrolyte from sump tank 805 into intermediate tanks 701a, 701b, 701c through electrolyte conduits 806a, 806b, 806c. Electrolyte then flows from intermediate tanks 701a, 701b, 701c into regenerator stacks 600a, 600b, 600c through, but not limited to, internal paths. In a particle deposition process, energy is applied from external source 901a, 901b, 901c to generate metallic particles of a dendritic morphology and release oxygen gas, which accumulates in the connected intermediate tanks 701a, 701b, 701c and conduit 807a, 807b, 807c. The intermediate tanks and sump tank release the generated oxygen at pressures close to atmospheric. In addition, they allow for the discrete operation of regenerator stacks 600a, 600b, 600c at different electrolyte levels 810a, 810b, 810c. In a particle dislocation process, metal ion-rich electrolyte is fed from sump tank 805 into intermediate tanks 701a, 701b, 701c and into regenerator stacks 600a, 600b, 600c through electrolyte conduits 806a, 806b, 806c. After the dislocation process in the regenerator stacks finishes as described in FIG. 3B, the electrolyte-particle slurry is then transferred from intermediate tanks 701a, 701b, 701c into sump tank 805 through electrolyte conduits 807a, 807b, 807c. Any accumulated oxygen is now transferred to and released from the sump tank 805 to the atmosphere. The electrolyte-particle slurry is then delivered from sump tank 805 to fuel storage tank 800 through electrolyte conduit 808. The sump tank 805 is recharged with fresh electrolyte through conduit 809. Said sump tank provides an exhaust mechanism 802 whereby said discharged oxygen is released to the atmosphere at atmospheric pressure. Another function of said sump tank is to provide a mechanism to separate particles from discharged electrolytes of regenerator stacks 600a, 600b, 600c. Said sump tank has features, for example but not limited to a baffle or a particle settling zone, to enable better separation. In some embodiments sump tank 805 can deliver 100 g/L or more of particles to fuel storage tank 800 and 5 g/L or less of particles back to regenerator stacks 600a, 600b, 600c.

Figure 15:
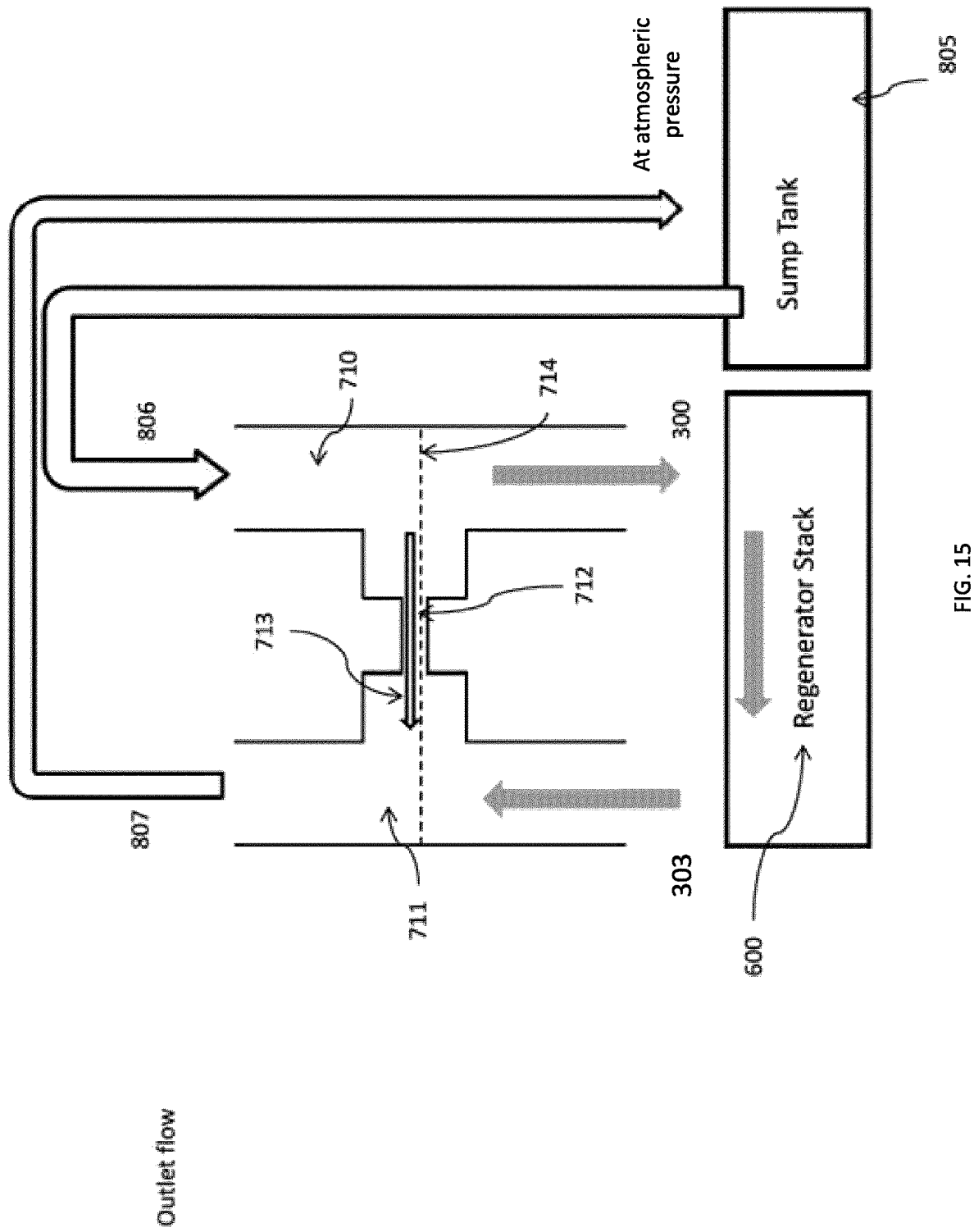
FIG. 15 is a schematic illustration of a sample in-line component according to an embodiment of the invention, wherein a fixed feature facilitates the breakage of pressure of the regenerator stack from that of the sump tank and allows for discrete operation of said stack.

According to an embodiment of an invention, the regenerator stacks 600a, 600b, 600c, may include an internal feature which facilitates both the upholding of atmospheric pressure and the breakage from upstream pressure. One example of said feature is illustrated in FIG. 15. Said feature is incorporated in an in-line component for example but not limited to a connecting piping or integrated tank. Said feature consists of inlet pipe 710, outlet pipe 711, and a relatively smaller interconnecting pipe 712. During both the particle dislocation process and the particle dissolution process, flowing electrolyte from sump tank 805 and conduit 806 is being pumped through inlet pipe 710 and subsequently reaches inlet manifold 300 for flow distribution within the stack. Due to the upstream pressure, dislocated particles along with pressurized flowing electrolyte exits the regenerator stack through outlet manifold 303 and outlet pipe 711 to conduit 807 and sump tank 805. When the particle dissolution process finishes, the flow of electrolyte terminates. Consequently the siphoning force resulting from the atmospheric pressure and downstream gravity pulls the electrolyte from both the outlet pipe 711 and the regenerator stack 600, and thereby empties the regenerator stack 600. To preserve the electrolyte in said stack, the interconnecting pipe 712 partially disrupts said force by allowing the electrolyte of the inlet pipe 710 to be pulled simultaneously, as shown by the flow 713, such that both portions of the outlet pipe 711 and inlet pipe 710 are drained first before the regenerator stack 600. The interconnecting pipe 712 thus enables the generation of an air-gap separation denoted by electrolyte level 714. In other words, with no moving component the interconnecting pipe 712 allows for the preservation of the stack electrolyte and for the decoupling of pressure from the sump tank. Said interconnecting pipe is designed and sized based on the criteria of, for example, 1) providing surface tension less than said siphon force such that flow from inlet pipe 710 can be pulled by said force and 2) limiting flow from going directly from inlet pipe 710 to outlet pipe 711 and thus bypassing the regenerator stack 600.

Figure 16:
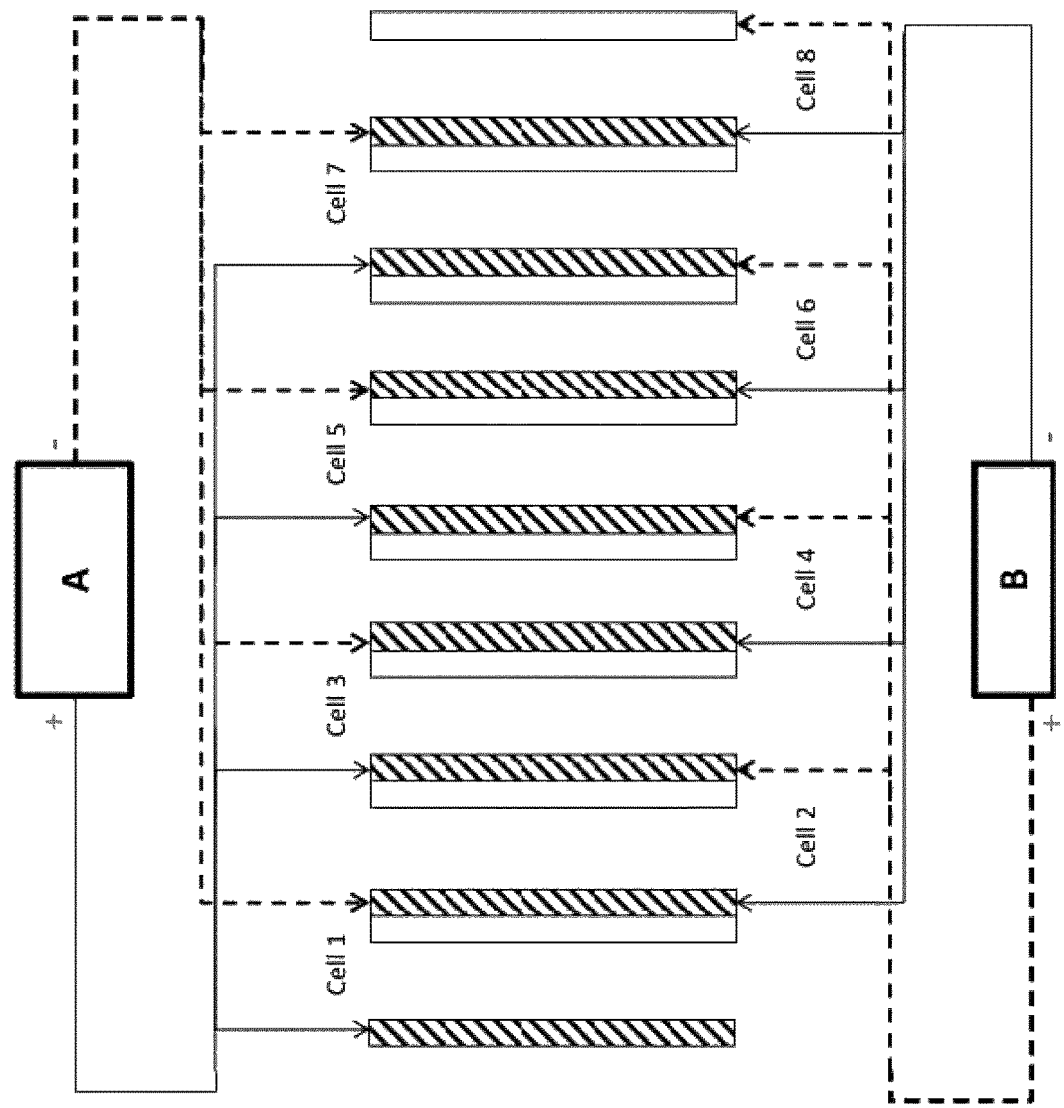
FIG. 16 is a schematic illustration of the circuit diagram of a two-stage particle dissolution process according to an embodiment of the invention, wherein a regenerator unit consists of a group of odd-numbered cells and a group of even-numbered cells wherein the particle dissolution process is sequentially performed.

FIG. 16 is a circuit diagram illustrating the circuit scheme of a particle dissolution process according to an embodiment of the invention wherein a plurality of cells is divided into, for example but not limited to, two groups. The first group consists of odd-numbered cells connected to circuit A. The second group consists of even-numbered cells connected to circuit B. Cells in both groups are in respective parallel circuits. Said circuits are established by connecting each connector 101 in FIG. 1 (not shown) within each regenerator cell to its respective circuit group. The inventors have determined that the particle dissolution process cannot be executed across the entire stack at once because this may create an imbalance of metal dissolution efficiency, leading to a discrepancy in the initial condition of each cathode of said regenerator cell prior to the next particle deposition process. Said discrepancy may fail the system over time.

Figure 17A:
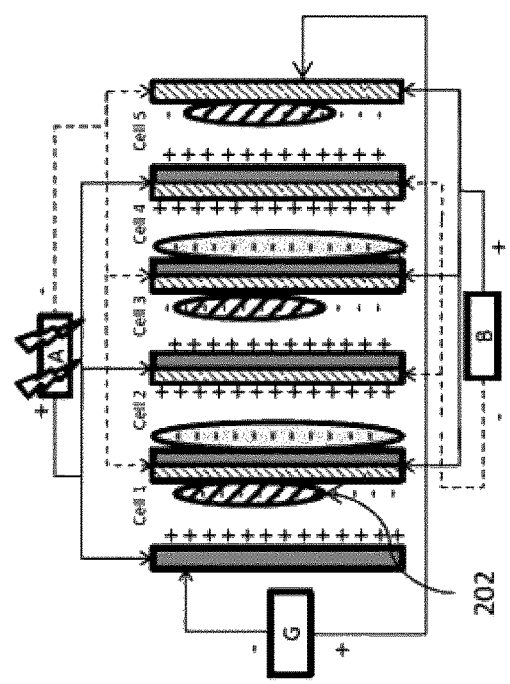
FIGS. 17A to 17D are schematic illustrations of undesirable in-situ particle deposition process during the multistage particle dissolution process in a regenerator unit consisting of a group of odd-numbered cells and a group of even-numbered cells.
Figure 17C:
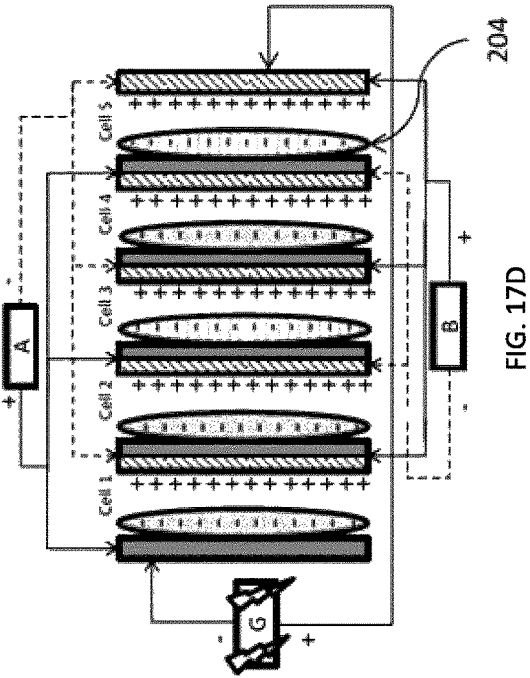
Figure 17B:
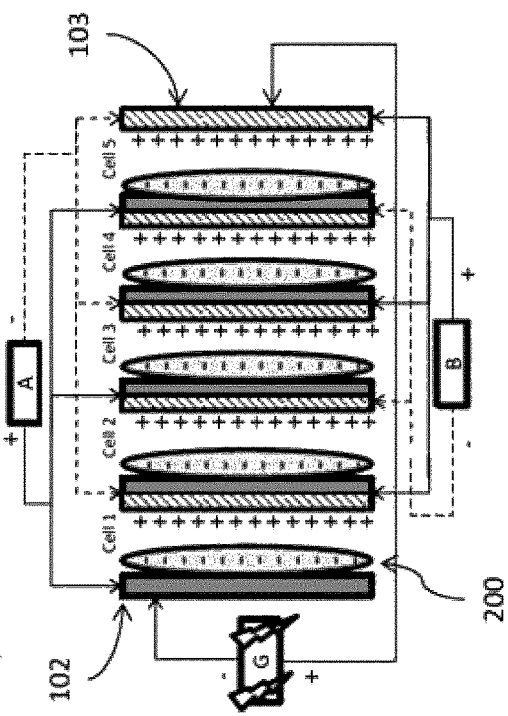

In one embodiment as described in FIGS. 17A to 17D, after the particle deposition process wherein metallic particles 200 are deposited on the cathode 102 as illustrated in FIG. 17A, the particle displacement process begins followed by the particle dissolution process. These processes operations are previously shown in FIG. 2. Said particle dissolution process can be a multi-stage process wherein at the first stage (FIG. 17B), a voltage is applied across each odd-numbered cell and the metallic particles in the first group of cells dissolve while the second group of cells serves as electrical insulation cells. If there is a prolonged particle dissolution process due to the previous deposition under undesirable conditions in any one of the cells, a small amount of anodic particles 202 may be deposited on the anode of the same cell at the completion of the first stage of the dissolution process. After, circuit A is disconnected and subsequently the first group of cells serves as electrical insulation cells while circuit B applies a voltage across all even-numbered cells to dissolve their respective metallic particles as shown in FIG. 17C. Because of the electrically conductive nature of the bipolar electrodes, the insulating cell may have a potential gradient that may lead to a re-deposition of particles 202 from one electrode of the odd-numbered cell to the opposite electrode of the same odd-numbered cell, and form a small amount of redeposited particles 203. This embodiment of circuit scheme offers the advantage of quicker process time as a result of the dissolution process being performed in two or more groups of cells instead of in each individual cell.

To further describe, said circuit scheme may have a disadvantage of promoting a metal "shuttling" effect, defined as metallic particles being deposited back and forth between the anode 103 and the cathode 102 in the consecutive steps consisting of the two- or multi-stage particle dissolution process and the particle deposition process. Said shuttling effect is especially of concern when the particle displacement process may become less efficient and an excess amount of metallic particles may remain on the cathode 102. In the subsequent two-stage particle dissolution process wherein polarities of electrodes are reversed, some of the metallic particles in odd-numbered cells (group A in FIGS. 17A-D) are dissolved into the electrolyte while the remainder is deposited onto a reversed-polarity anode (or, now, cathode) side of the bipolar electrode, at a much lower current density which may promote plating. Due to the bipolar configuration said reversed-polarity anode is in the same electrical circuit of the adjacent even-numbered cell, as illustrated by anodic particles 202 in FIG. 17B.

As shown in FIG. 17C when the second stage of the particle dissolution process commences, due to the simultaneous polarization of the even-numbered cells, particles 202 previously deposited under the first stage may be re-deposited or re-plated (at a lower current density) back to the odd-numbered cells consisting of a reversed-polarity cathode (or, now, anode), as redeposited particles 203. As a result there is always an unaccountable amount of metallic particles 202, 203 remaining on both the cathode 102 and the anode 103 of the bipolar electrode. This two-stage dissolution step forms a deposition on the anode of the even-numbered cells and redeposits particles onto cathodes of the odd-numbered cells.

Figure 17D:
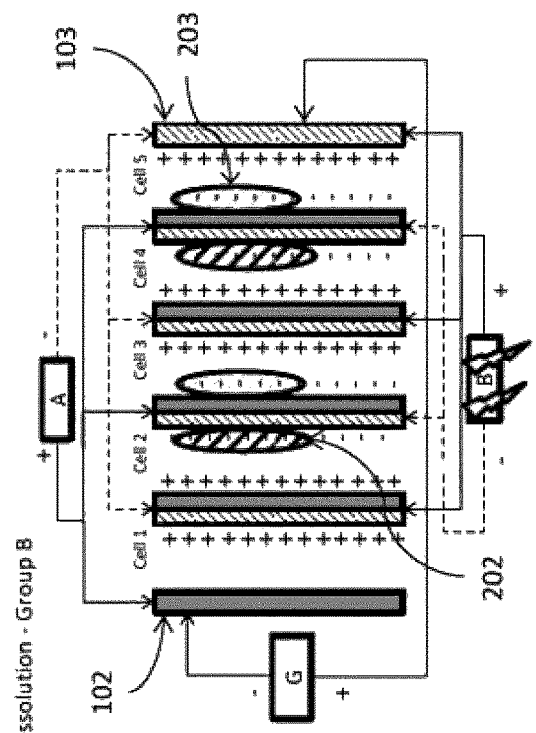

At the anode side of the bipolar electrode 103 the subsequent particle deposition step fully oxidizes any previously deposited anodic particles 202 and will not be of concern. On the other hand at the cathode 102, metallic particles are deposited on top of said redeposited particles 203 in the next particle deposition process as illustrated in FIG. 17D, forming deteriorated particles 204. Said deteriorated particles 204 have different morphology than that of original metallic particles 200 and may require more energy to dislocate and dissolve in both the dislocation step and dissolution steps. In addition, as the regeneration process continues according to the two-step dissolution process, said deteriorated particles 204 may shuttle within a particular cell over the entire operating period, worsening the condition of said cell as it requires an increasing amount of energy to complete the particle dissolution process. Over a number of operating cycles this accumulation of particles may ultimately fail the operation. Said sequence of operation can be expressed as GAB-GAB, where A and B are the circuit groups shown in FIG. 17B and FIG. 17D, respectively, and G denotes a particle generation step shown in FIG. 17A and FIG. 17D.

Figure 18A:
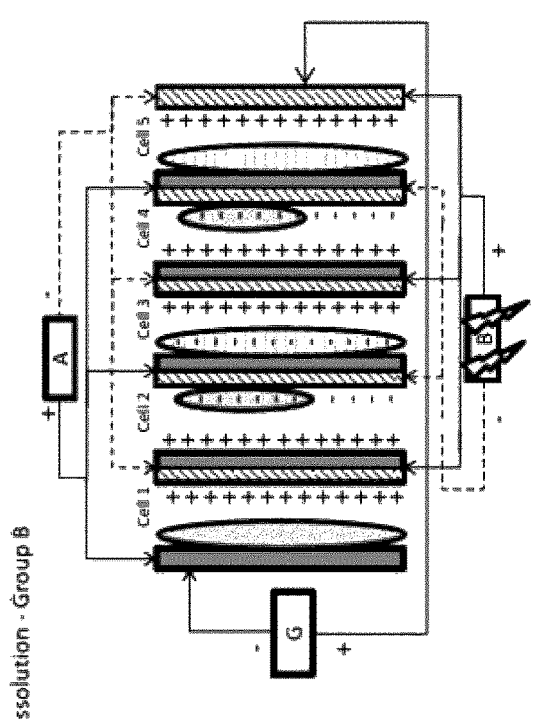
FIGS. 18A to 18D are schematic illustrations of a multistage particle dissolution process in a regenerator unit according to an embodiment of the invention, consisting of a group of odd-numbered cells and a group of even-numbered cells wherein the repetition of the undesirable in-situ particle deposition can be eliminated.
Figure 18B:
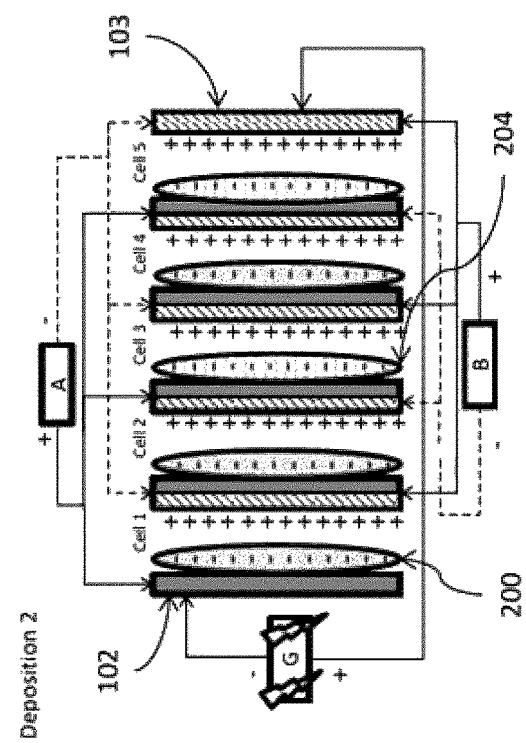
Figure 18C:
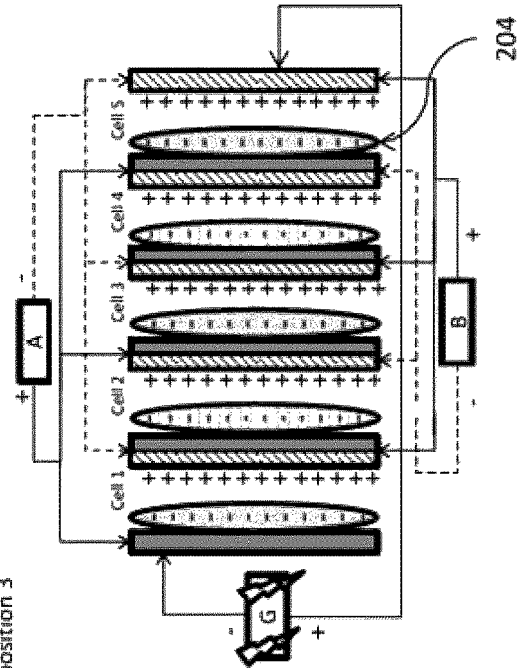
Figure 18D:
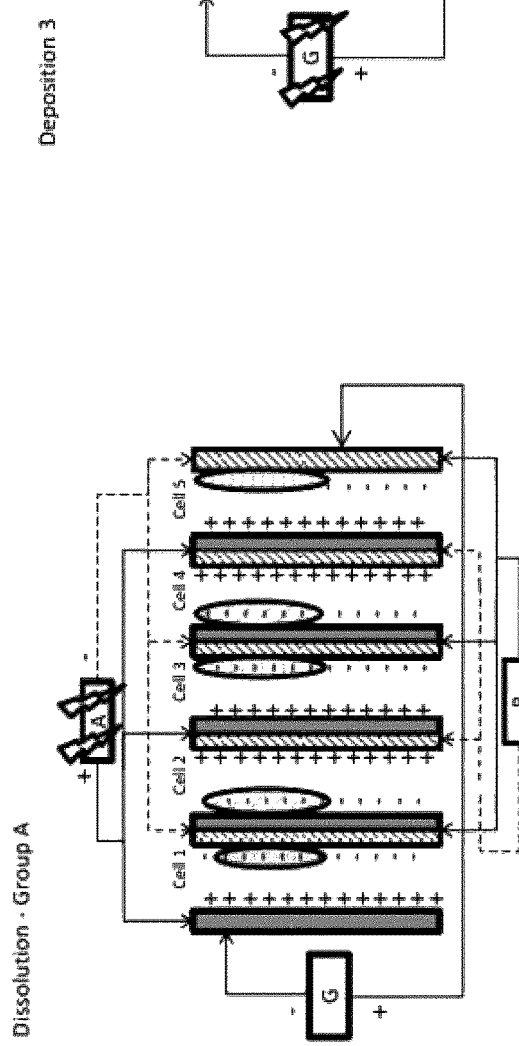

To prevent said shuttling effect, an alternative arrangement of the form GAB-GBA as opposed to GAB-GAB may be adopted. Said GBA arrangement eliminates the accumulation of shuttled metallic particles 202, 203 within one or more cells by altering the sequence of dissolution steps and by completely dissolving deteriorated metallic particles 204, particles of different morphology, in the dissolution step. FIGS. 18A-18D show the sequence of operations described as GAB-GBA. After the end of the dissolution step for group B (FIG. 17C) and after the next particle deposition step (FIG. 18A) that forms both dendritic metallic particles 200 and deteriorated particles 204, the dissolution step for group B is carried out first (FIG. 18B). As such, dendritic metallic particles 200 are first deposited onto the anode. Next, the dissolution step for group A proceeds, wherein deteriorated particles 204 in cell 3 and cell 5 are deposited onto the anode of each respective cell, as shown in FIG. 18C. Said arrangement therefore forms deposition on the anode of the odd-numbered cells and redeposit particles onto cathodes of the even-numbered cells.

Figure 19:
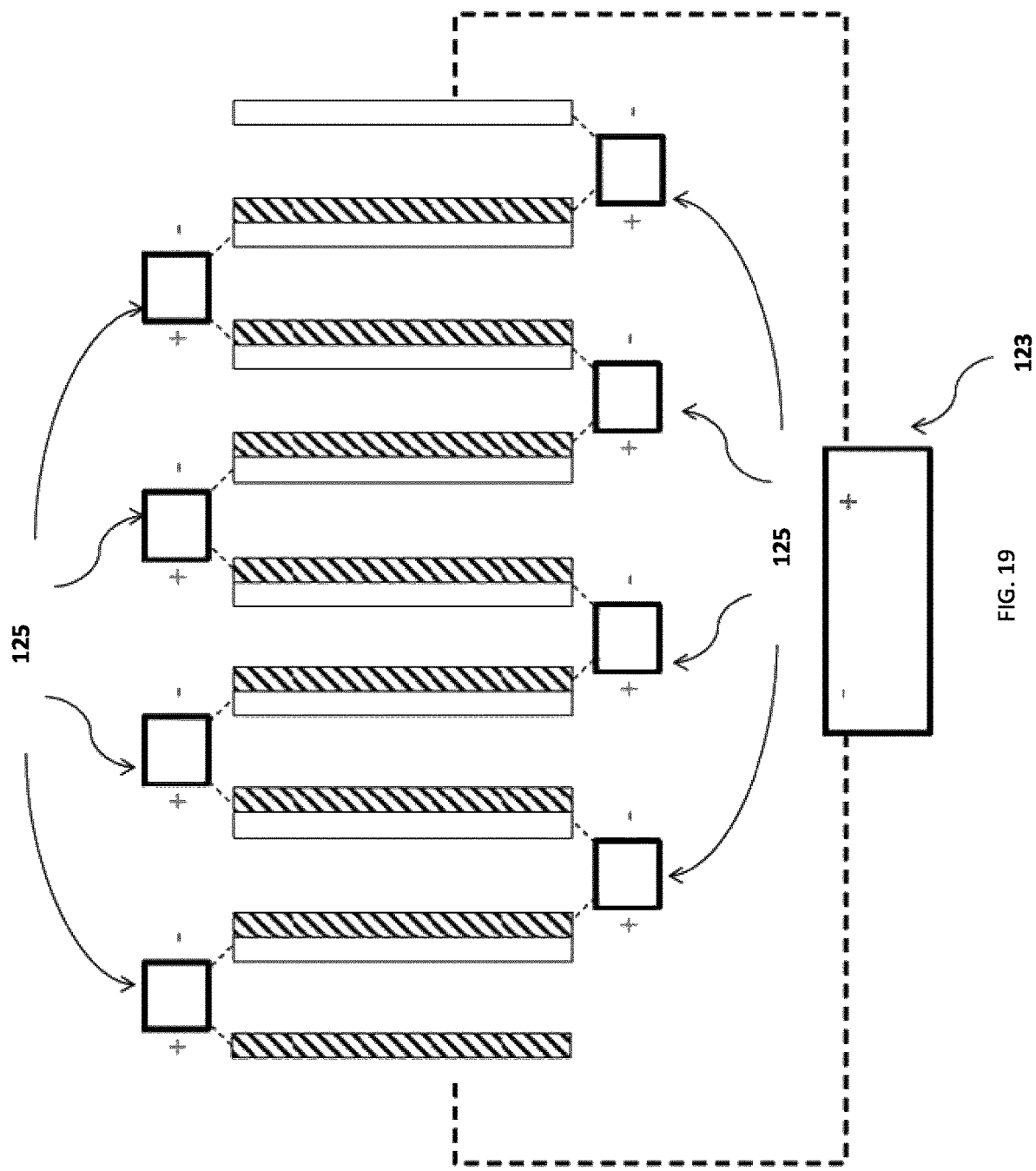
FIG. 19 is a schematic illustration of a circuit diagram consisting of discrete power supplies in each individual cell to execute discrete particle dissolution process according to an embodiment of the invention.

As yet another alternative embodiment, FIG. 19 is a schematic illustration of the circuit arrangement consisting of discrete power supply 125 connecting to each of a plurality of regenerator cells. Said power supply is disconnected from the main power supply 123 for the particle deposition process. Said arrangement can mitigate the negative effect of particle shuttling by performing the particle dissolution process sequentially in each individual cell.

It will be obvious to those skilled in the art that the cells of a regeneration unit can be divided into two or more groups consisting of, e.g., A, B, C, D, E etc., and the sequence of particle dissolution arrangements can be in any combination of these groups, for example but not limited to, GABC-GCBA or GABCD-GABCD, in order to achieve the elimination of the particle shuttling effect. Further, it will be apparent to those skilled in the art that the arrangements shown in FIG. 16-FIG. 19 are not exhaustive and that alternative arrangements and combinations thereof are available and are encompassed by the invention.

Figure 20:
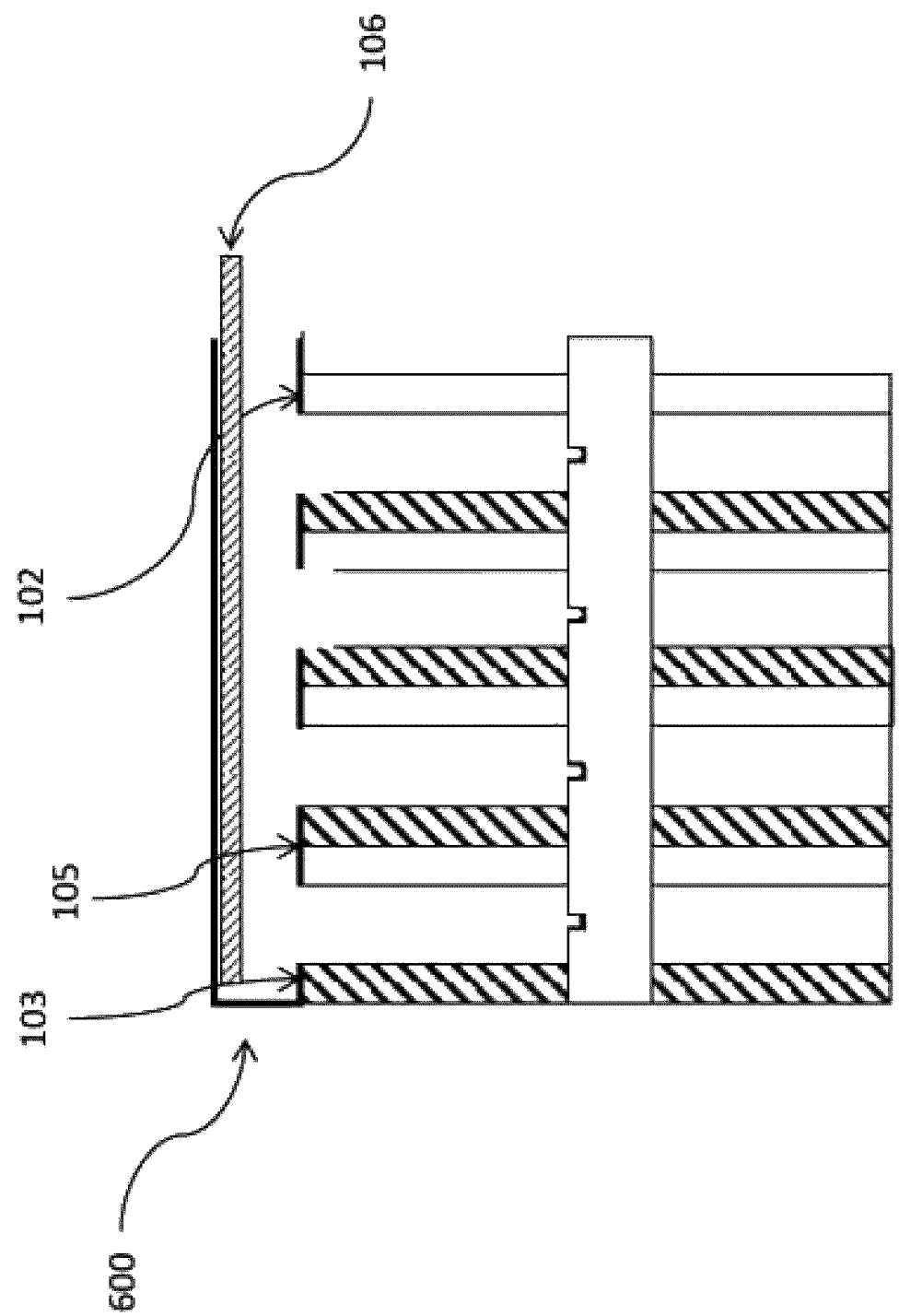
FIG. 20 is a schematic illustration of the basic elements of a regenerator cell according to an embodiment of the invention, wherein said regenerator cell consists of the anode, the cathode, or the bipolar electrode, and the auxiliary electrode.

FIG. 20 is a schematic illustration of the basic elements and structure of a regenerator stack 600 according to an embodiment of the invention further comprising an auxiliary electrode 106 in the cell cavity wherein the position of the auxiliary electrode 106 is, for example and not limited to, directly above the anode 103, the cathode 102, and the bipolar electrode 105, and wherein said auxiliary electrode 106 is not in physical contact with the cathode 102, the anode 103 or a plurality of bipolar electrodes 105. Said auxiliary electrode is implemented to mitigate said particle shuttling effect and to maintain the advantage of a simultaneous particle dissolution process in each cell. Said auxiliary electrode 106 is made of conducting materials, for example but not limited to stainless steel, that has high hydrogen evolution potential to stimulate a fast self-cleaning mechanism wherein any deposited particles on its surface are galvanically corroded in the electrolyte. In one embodiment the metallic particles are zinc particles and the galvanic corrosion proceeds according to the following equations:

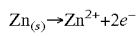

$$Zn_{(s)} \rightarrow Zn^{2+} + 2e^-$$

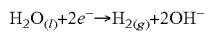

$$H_2O_{(l)} + 2e^- \rightarrow H_{2(g)} + 2OH^-$$

Figure 21B:
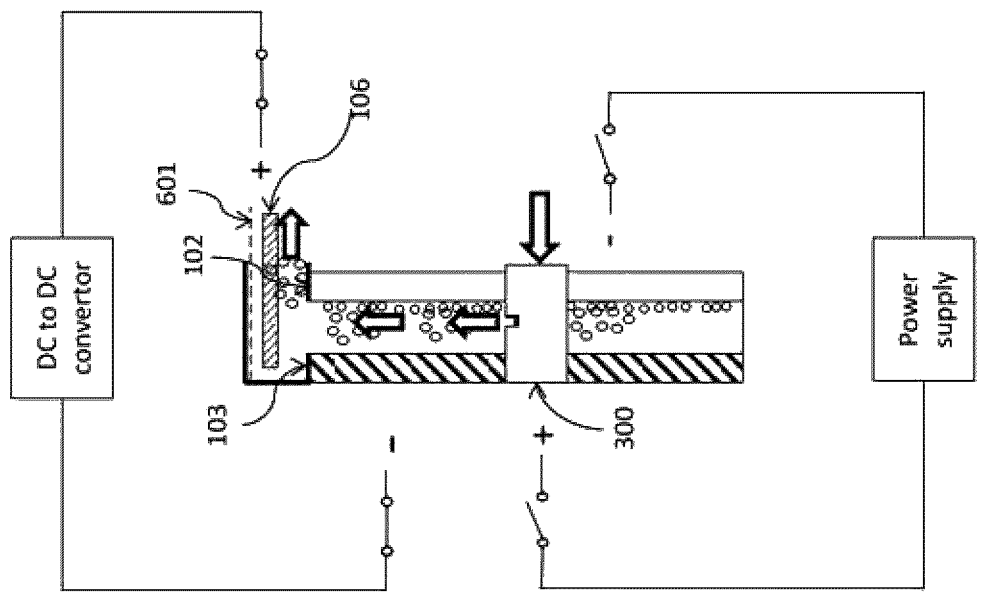
FIG. 21B is a schematic illustration of the basic elements and structure of a regenerator stack according to an embodiment of the invention, the stack consisting of an anode, a cathode and an auxiliary electrode in the area wherein during the particle displacement process and the particle dissolution process the said auxiliary electrode has established ionic contact with the other two electrodes through the electrolyte.
Figure 21A:
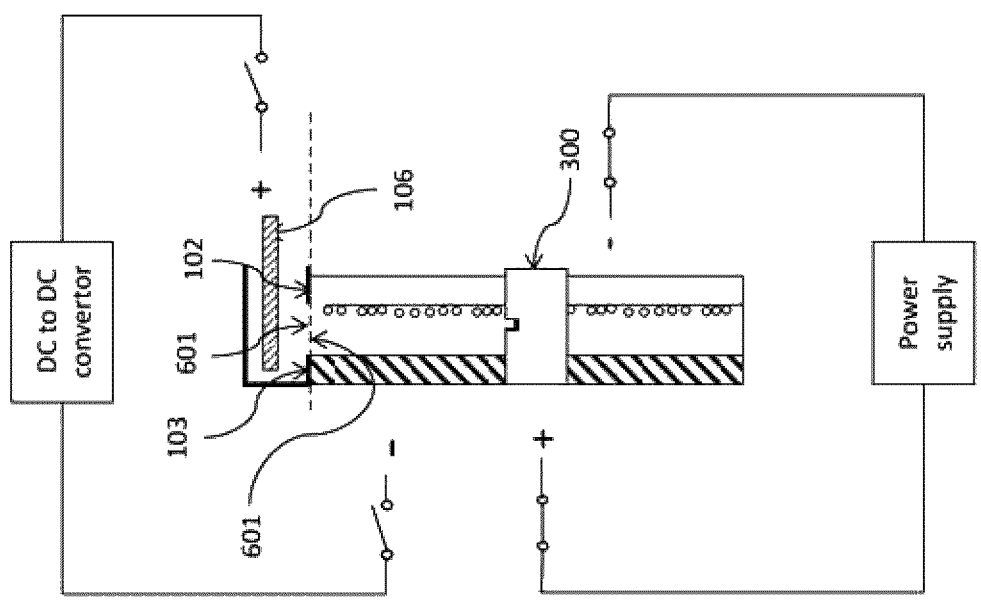
FIG. 21A is a schematic illustration of the basic elements and structure of a regenerator stack according to an embodiment of the invention, the stack consisting of an anode, a cathode and a third or auxiliary electrode in the area wherein the said auxiliary electrode has no physical contact with the other two electrodes during the particle deposition process.

FIG. 21A illustrates the electrical circuit and the electrolyte level 601 of the regenerator cell in a particle deposition process wherein the electrolyte level is always below the auxiliary electrode 106 due to said air-lock mechanism (see FIG. 11). Said auxiliary electrode is connected to a separate circuit independent from the main circuit.

FIG. 21B illustrates the electrical circuit and the electrolyte level 601 of the regenerator cell according to an embodiment of the invention in both the particle displacement and dissolution processes according to an embodiment of the invention wherein the auxiliary electrode 106 is immersed in the electrolyte once there is an establishment of electrolyte flow (illustrated as arrows). Such immersion allows for the establishment of an ionic contact between the auxiliary electrode and a single or a plurality of cathodes 102 wherein a metal dissolution process may be attained. Under a metal dissolution process wherein the polarity of the electrode is reversed, the cathode of each regenerator cell becomes the anode. Connecting to a separate circuit, said auxiliary electrode then acts as the cathode for every regenerator cell in the stack. This configuration allows for a simultaneous metal dissolution and in the case wherein a shuttling effect occurs, the metal deposition will occur on said auxiliary electrode instead of on the original cathodes 102 as previously discussed.

This application is intended to cover any variations, uses, or adaptations of the invention using its general principles. Further, this application is intended to cover such departures from the present disclosure as come within known or customary practice in the art to which this invention pertains and which fall within the limits of the appended claims. Accordingly, the scope of the claims should not be limited by the preferred embodiments set forth in the description, but should be given the broadest interpretation consistent with the description as a whole.

The invention claimed is:

1. A regenerator stack comprising a plurality of regenerator cells, each regenerator cell for regenerating metallic particles, and comprising:
   a housing for containing a quantity of electrolyte;
   an anode;
   a cathode for deposition of the metallic particles;
   a cavity at least partially defined by the housing, the cathode and the anode;
   an inlet port for supplying electrolyte to the cell, the inlet port in fluid communication with the cavity; and
   an outlet port for expelling electrolyte, particles and/or gas from the cell, the outlet port in fluid communication with the cavity;
   wherein the plurality of regenerator cells are configured to enable fluid isolation between cavities of the regenerator cells, whereby an air lock is established as between the cavities of the regenerator cells;
   wherein the regenerator stack comprises a plurality of regenerator cells; and
   wherein the cathode of one regenerator cell is in physical contact with, and electrically connected to, the anode of an adjacent regenerator cell to provide a bipolar electrode.

2. A regenerator stack according to claim 1 wherein for each regenerator cell the outlet port is located above a level of the electrolyte in the cavity and is capable of forming an airlock to prevent draining of electrolyte.

3. A regenerator stack according to claim 1 wherein for each regenerator cell the inlet port is located above the level of the electrolyte in the cavity and is capable of forming an airlock to prevent draining of electrolyte.

4. A regenerator stack according to claim 1 wherein for each regenerator cell the inlet port is located below a level of the electrolyte in the cavity, wherein the inlet port is rotatable and wherein a rotation means for rotating the inlet port is selected from the group consisting of magnets, a fluid pressurizer, and a motor.

5. A regenerator stack according to claim 4 wherein for each regenerator cell the inlet port comprises a radially extending arm, the arm comprising at least one opening facing a surface of the cathode, the at least one opening in fluid communication with a manifold outlet; wherein:
   optionally the at least one opening comprises a plurality of holes spaced apart along the arm, each of the plurality of holes in fluid communication with the inlet port, optionally each of the plurality of holes has a width or diameter in the range of 0.1 mm to 3 mm and is spaced apart by 0.5 mm to 3 mm; and optionally the at least one opening comprises an open channel extending along the arm, the channel in fluid communication with the inlet port.

6. A regenerator stack according to claim 5 wherein, for each regenerator cell an inner surface of the at least one opening of the arm is lined with a metal capable of galvanic corrosion of the metallic particles; wherein the metal is optionally stainless steel or platinum.

7. A regenerator stack according to claim 1 wherein, for each regenerator cell:

the cathode and the anode are substantially planar;

the cathode has a surface roughness RMS of 0.05 micron to 1 micron;

an outer edge of the cathode comprises a nonconductive and nonporous coating comprising oxides; or a ratio of a distance between the anode and the cathode relative to the height of the anode and the cathode is in the range of 1:1 to 1:40.

8. A regenerator stack according to claim 1 wherein, for each regenerator cell the cathode comprises magnesium, chromium, niobium, zirconium, titanium, hafnium, tantalum, yttrium, strontium, calcium, scandium, tungsten, or an alloy of those metals with any other metals; or wherein the anode comprises nickel, a nickel alloy, manganese, manganese based oxides, perovskites, spinel structures or oxide and layered hydroxides.

9. A regenerator stack according to claim 1, wherein, each regenerator cell comprises an auxiliary electrode located within the cavity, wherein the auxiliary electrode is spaced apart from the cathode and the anode, wherein the auxiliary electrode is capable of establishing ionic conduction with the cathode or the anode through an aqueous electrolyte, wherein the auxiliary electrode optionally comprises platinum, gold, nickel, iron, tungsten or any metals or any alloys of metals with hydrogen evolution potential less than or equal to that of iron.

10. A regenerator stack according to claim 1, further comprising an inlet manifold capable of distributing electrolyte to a plurality of inlet ports and an outlet manifold capable of expelling electrolyte, particles and/or gas from a plurality of outlet ports; wherein the regenerator cells are optionally connected in series.

11. A regenerator stack according to claim 1 further comprising a plurality of connectors connecting a plurality of bipolar electrodes to enable the establishment of a reverse circuit scheme differentiated from a forward circuit scheme.

12. A regenerator system comprising a regenerator stack according to claim 1 and an intermediate tank in fluid communication with the cavities of the regenerator cells of the regenerator stack.

* * * * *